US011443522B2

United States Patent
Major et al.

(10) Patent No.: US 11,443,522 B2
(45) Date of Patent: Sep. 13, 2022

(54) PROCESSING SENSOR INFORMATION FOR OBJECT DETECTION

(71) Applicant: QUALCOMM Incorporated, San Diego, CA (US)

(72) Inventors: Bence Major, Amsterdam (NL); Daniel Hendricus Franciscus Fontijne, Haarlem (NL); Ravi Teja Sukhavasi, La Jolla, CA (US); Amin Ansari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 49 days.

(21) Appl. No.: 16/701,021

(22) Filed: Dec. 2, 2019

(65) Prior Publication Data

US 2020/0175286 A1 Jun. 4, 2020

Related U.S. Application Data

(60) Provisional application No. 62/773,710, filed on Nov. 30, 2018.

(51) Int. Cl.
*G06V 20/00* (2022.01)
*G06V 20/56* (2022.01)
(Continued)

(52) U.S. Cl.
CPC .......... *G06V 20/56* (2022.01); *G06K 9/6267* (2013.01); *G06T 7/60* (2013.01); *G06T 7/70* (2017.01);
(Continued)

(58) Field of Classification Search
CPC .... G06K 9/00791; G06K 9/3208; G06K 9/46; G06K 9/6267; G06T 7/70; G06T 7/60;
(Continued)

(56) References Cited

U.S. PATENT DOCUMENTS 10,872,228 B1* 12/2020 Zhou .................. G06K 9/00791
2018/0182088 A1* 6/2018 Leordeanu ................ G06T 7/60
(Continued)

OTHER PUBLICATIONS

Liu et al Single Shot MultiBox Detector, arXiv 1512.02325v5 Dec 29 (Year: 2016).*
(Continued)

*Primary Examiner* — Nancy Bitar
*Assistant Examiner* — Xiao Liu
(74) *Attorney, Agent, or Firm* — The Marbury Law Group

(57) ABSTRACT

Methods of processing vehicle sensor information for object detection may include capturing generating a feature map based on captured sensor information, associating with each pixel of the feature map a prior box having a set of two or more width priors and a set of two or more height priors, determining a confidence value of each height prior and each width prior, outputting an indication of a detected object based on a highest confidence height prior and a highest confidence width prior, and performing a vehicle operation based on the output indication of a detected object. Embodiments may include determining for each pixel of the feature map one or more prior boxes having a center value, a size value, and a set of orientation priors, determining a confidence value for each orientation prior, and outputting an indication of the orientation of a detected object based on the highest confidence orientation.

30 Claims, 14 Drawing Sheets

(51) Int. Cl.
*G06T 7/70* (2017.01)
*G06K 9/62* (2022.01)
*G06T 7/60* (2017.01)
*G06V 10/40* (2022.01)
*G06V 10/24* (2022.01)
*G05D 1/02* (2020.01)

(52) U.S. Cl.
CPC ............ *G06V 10/242* (2022.01); *G06V 10/40* (2022.01); *G05D 1/0231* (2013.01); *G05D 1/0257* (2013.01); *G05D 1/0276* (2013.01); *G06T 2207/30252* (2013.01)

(58) Field of Classification Search
CPC ........ G06T 2207/30252; G05D 1/0231; G05D 1/0257; G05D 1/0276
See application file for complete search history.

(56) References Cited

U.S. PATENT DOCUMENTS

| | | | | |
|---|---|---|---|---|
| 2019/0096086 | A1* | 3/2019 | Xu | G06T 7/60 |
| 2020/0156254 | A1* | 5/2020 | Li | G06K 9/3241 |
| 2020/0160552 | A1* | 5/2020 | Hashimoto | G06K 9/6274 |

OTHER PUBLICATIONS

Zhu et al Single Shot Text Detector with Rotational Prior Boxes, Neural Processing Lett, 49:863-877 (Year: 2019).*

Ren et al., Faster R-CNN: Towards Real-Time Object Detection with Region Proposal Networks, IEEE TR on Pattern Analysis and Machine Intelligence, vol. 39, No. 6, Jun. 2017, pp. 1137-1149 (Year: 2017).*

Feng D., et al., "Towards Safe Autonomous Driving: Capture Uncertainty in the Deep Neural Network for Lidar 3D Vehicle Detection", 2018 21st International Conference on Intelligent Transportation Systems (ITSC) IEEE, Nov. 4, 2018 (Nov. 4, 2018), pp. 3266-3273, XP033470375, DOI: 10.1109/ITSC.2018.8569814, ISBN 378-1-7281-0321-1, [retrieved on Dec. 7, 2018], t8 pages.

International Search Report and Written Opinion—PCT/US2019/064075—ISA/EPO—dated Mar. 20, 2020—16 pages.

Wei L., et al., "SSD: Single Shot MultiBox Detector", Robo Cup 2008: Robot Soccer trorld Cup XII, Jan. 1, 2016 (Jan. 1, 2016), XP055553347, pp. 21-37, Cham DOI: 10.1007/978-3-319-46448-0_2, ISBN : 978-3-319-10403-4, 18 Pages, Retrieved from the Internet: URL: https://arxiv.org/pdf/1512.02325.pdf, 18 pages.

Zhu W., et al., "Single Shot Text Detector with Rotational Prior Boxes", Neural Processing Letters, Kluwer Academic Publishers, Norwell, MA, US, vol. 49, No. 3, Mar. 3, 2018 (Mar. 3, 2018), pp. 863-877, XP036798087, ISSN 1370-4621, DOI: 10.1007/S11063-018-9810-Z, [retrieved on Mar. 3, 2018], 15 pages.

\* cited by examiner

| Final Indication Of Detected Object | |
|---|---|
| Class | Vehicle |
| Center | (17.2 m, 22.8 m) |
| Height | 5.13 m |
| Width | 1.9 m |
| Height confidence | 54% |
| Class confidence | 85% |
| Width confidence | 70% |

PROCESSING SENSOR INFORMATION FOR OBJECT DETECTION

RELATED APPLICATIONS

This application claims the benefit of priority to U.S. Provisional Application 62/773,710 entitled Processing Sensor Information for Object Detection, filed Nov. 30, 2018, the entire contents of which are hereby incorporated by reference for all purposes.

BACKGROUND

Typical autonomous vehicles and semiautonomous vehicles can detect information about their location and surroundings (for example, using cameras, radar, lidar, GPS, file odometers, accelerometers, and other sensors), and include control systems that interpret sensor information to identify hazards and determine navigation paths to follow. Such vehicles include control systems to operate with limited or no control from an occupant or other operator of the automobile. Safe operation of these vehicles depends upon early and accurate identification of obstacles and tracking and predicting the movement of other vehicles in the dynamic and busy environment of streets and highways.

Some autonomous vehicles and semiautonomous vehicles include computer systems that implement neural networks for object detection within images. Autonomous and semi-autonomous vehicle systems can use object detection systems for making driving decisions.

SUMMARY

Various aspects include methods for improving the processing of vehicle sensor information to detect objects. Various aspects include methods that may be implemented in a processor of a vehicle control unit, such as a processor within a vehicle navigation system for an autonomous or semiautonomous vehicle or within a vehicle safety system.

Various aspects may include capturing, by a sensor, sensor information regarding an environment around the sensor, generating, by a processor, a feature map based on the sensor information, associating, by the processor, with each pixel of the feature map a prior box including a set of two or more width priors and a set of two or more height priors, determining, by the processor, a confidence value of each height prior and each width prior, outputting, by the processor, an indication of a detected object based on a highest confidence height prior from among the set of height priors and a highest confidence width prior from among the set of width priors, and performing, by the processor, a vehicle operation based on the output indication of a detected object.

Some aspects may include selecting the highest confidence height prior from the set of two or more height priors, and selecting the highest confidence width prior from the set of two or more width priors. Some aspects may include determining a height refinement value for each of the set of height priors, and determining a width refinement value for each of the set of width priors.

Some aspects may include refining the highest confidence height prior with the height refinement value, and refining the highest confidence width prior with the width refinement value. In some aspects, outputting an indication of a detected object based on a highest confidence height prior from among the set of height priors and a highest confidence width prior from among the set of width priors may include outputting the refined highest confidence height prior and the refined highest confidence width prior.

In some aspects, each associated prior box may include a center value. Such aspects may include determining for each prior box a center value refinement, and refining the center value with the determined center value refinement.

Some aspects may include determining for each prior box one or more object classifications, and determining for each of the one or more object classifications a confidence value. In some aspects, the output indication of a detected object may include one or more of a height confidence value and a width confidence value.

Various aspects may include capturing, by a sensor, sensor information regarding an environment around the sensor, generating, by a processor, a feature map based on the sensor information, associating, by the processor, with each pixel of the feature map one or more prior boxes comprising a center value, a size value, and a set of orientation priors, determining a confidence value for each orientation prior, outputting an indication of a detected object based on the highest confidence orientation, and performing a vehicle operation based on the output indication of a detected object.

Some aspects may include selecting for each prior box a highest confidence orientation prior from among the set of orientation priors. Some aspects may include determining an orientation refinement for each of the set of orientation priors. Some aspects may include refining the orientation value for each prior box based on the determined orientation refinement value. Some aspects may include rotating each prior box based on the refined orientation value. In some aspects, the output indication of a detected object may include an orientation confidence value.

Further aspects include a control unit for use in a vehicle having one or more sensors, the control unit including a processor configured with processor-executable instructions to perform operations of any of the methods summarized above. Further aspects include a vehicle including one or more sensors and a processor coupled to the one or more sensors and configured with processor-executable instructions to perform operations of any of the methods summarized above. Further aspects include a computing device including means to perform operations of any of the methods summarized above. Further aspects include a non-transitory processor-readable storage medium having stored thereon processor-executable software instructions configured to cause a processor of a computing device to perform operations of any of the methods summarized above. Further aspects include a system-on-chip including a processor configured with processor-executable instructions to perform operations of any of the methods summarized above. Further aspects include a system including sensors and a computing device having a processor configured with processor-executable instructions to perform operations of any of the methods summarized above. Further aspects include a system including means for performing functions of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
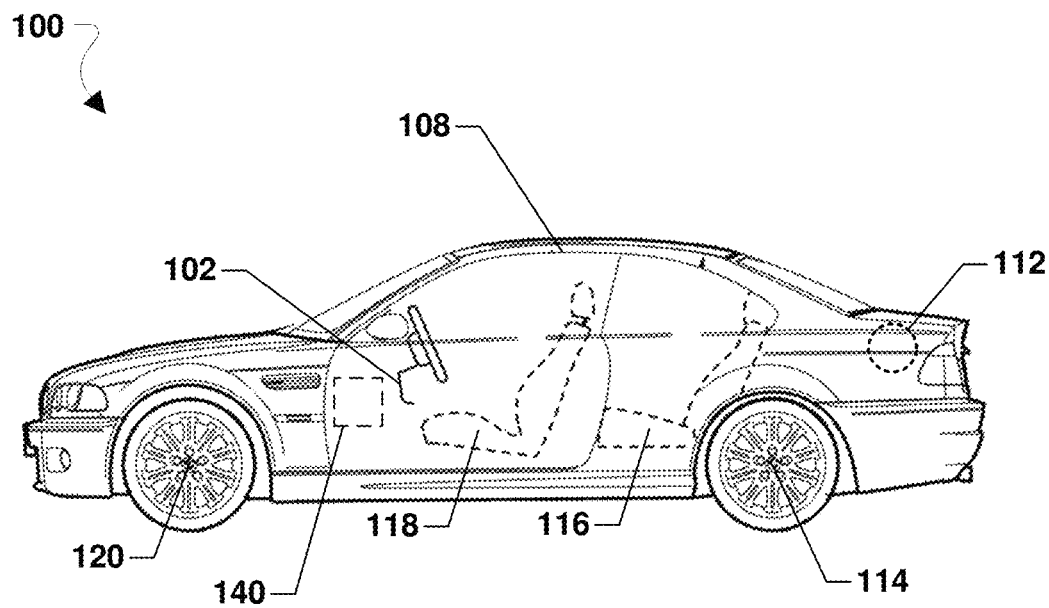
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments include methods, vehicle computing systems implementing the methods and processing devices for use in vehicles that are configured to implement the methods for processing vehicle sensor information for object detection. Various embodiments may improve the operation of autonomous and semi-autonomous vehicles by providing improved efficiency and accuracy of object detection from sensor information As used herein, the term "sensor information" refers to environmental information captured by one or more sensors of a vehicle, which may be processed by a processor of the vehicle to detect objects. Such sensors may include radar, lidar, camera, and other suitable sensors. Sensor information includes information output by such sensors that is unprocessed, as well as processed output, such as by signal processing to clarify or enhance the sensor information. Sensor information is not limited to information organized for or presented for human perception, such as a still image or a sequence of video images.

Autonomous and semi-autonomous vehicles typically include a plurality of sensors, including cameras, radar, and lidar, that collect information about the surrounding environment. Such collected information may enable a processor of vehicle to detect the roadway, identify objects to avoid, and track the position and movement of other vehicles, to enable partial or fully autonomous navigation. Even when operated by an occupant or other operator, such collected information may enable the vehicle to facilitate and/or improve reaction(s) of the occupant or other operator.

Some autonomous vehicles and semiautonomous vehicles include a processor that implements a neural network configured to detect objects within images gathered by vehicle sensors. As used herein, the term "object detection" refers to the process of detecting objects within a set of sensor data. When an object is detected, the processor may output an indication (e.g., information indicating or regarding) that an object has been detected, and in some cases characterizing or identifying the detected object with some level of confidence. Neural network processors have been shown to be efficient at detecting and/or recognizing objects within image and similar data. Neural networks are machine learning models that employ multiple layers of operations to predict one or more outputs from one or more inputs. The output of each layer is used as input to another layer in the network. Each layer of a neural network specifies one or more transformation operations to be performed on the input to the layer. Each layer generates one or more outputs using the current values of a set of parameters for the layer. Neural networks are typically trained to recognize objects within images by providing to the neural network a substantially large data set of images that include identified objects (sometimes referred to as "ground truth"). Once trained, the neural network may process inputs (e.g., images or other sensor data) to make determinations or detections of objects, which the neural network may output as indications that an object has been detected (e.g., within a portion of an image) and, in some cases, identification or classification of a detected object (e.g., a pedestrian or a vehicle). A processor may be configured use the output of detections or classifications of objects to make decisions affecting real world operations. For example, autonomous and semi-autonomous vehicle systems may use the output of a neural network object detection process for making navigation, maneuvering and other operational decisions (e.g., steering to avoid a detected object).

Improvements in the operation of processors that implement neural networks thus provide tangible, real-world benefits including improving autonomous vehicle navigation, improving object and collision avoidance systems for vehicle safety systems and autonomous vehicles. Such benefits may apply to any form of vehicle, including land vehicles (e.g., autonomous cars and robots), air vehicles (e.g., drones and aircraft autopilot systems), watercraft (e.g., autonomous surface and subsurface craft and navigation/collision avoidance systems), and spacecraft (e.g., orbital imaging systems and planetary rover vehicles). Thus, references to "vehicles" herein are meant to encompass any form of vehicle, and descriptions of embodiments using land vehicles (e.g., autonomous automobiles) are for illustration purposes and are not intended to limit the scope of the claims. Further, various embodiments may have technical applications beyond vehicle navigation and safety systems, including image recognition systems that process imagery through neural network processors.

Object detection performed by a neural network on sensor information may include determining a location and a semantic class or classification (e.g., person, vehicle, sign, building, etc.) of a detected object. A processor may employ one or more of a variety of machine learning and deep learning approaches to perform object detection. Deep learning approaches may be used to perform object detection without specifically defining features of objects to be detected. Some deep learning approaches may employ convolutional neural networks.

The Single Shot Detector (SSD) architecture is a deep learning approach that processes sensor information using a convolutional neural network typically once, then determines a feature map. The SSD then applies a set of default or candidate boxes ("bounding boxes" or "prior boxes") over different aspect ratios and scales to the feature maps. By determining the feature map as the sensor information is passed through the neural network, features for the prior boxes can be extracted in a single step. The SSD then generates confidence values for each object category in each of the default prior boxes. The SSD also determines adjustment offsets for the center value, the height, and the width of each the default prior boxes to better fit the default prior boxes to ground truth boxes. The SSD may then perform an operation such as non-maximum suppression to remove lower score or duplicate detections.

The typical SSD approach to object detection includes some inefficiencies and limitations. The application of multiple prior boxes with multiple sizes can produce a "combinatorial explosion" of complexity that increases exponentially, which increases the computational burden and inefficiency of the typical approach. The use of multiple prior boxes also limits the analysis of other features, such as an object's orientation or velocity, because adding additional priors to every prior box contributes to the "combinatorial explosion" of complexity and computational burden.

As a non-limiting example, conventional automotive radar systems do not provide any information regarding the orientation of objects. It is difficult to extract information pertaining to object orientation from an underlying radar signal using conventional signal processing as employed in such conventional radar systems.

Various embodiments include methods, vehicle control units implementing the methods, and computing devices for use in vehicles that are configured to implement the methods for processing vehicle sensor information for object detection. Various embodiments may improve the operation of autonomous and semi-autonomous vehicles by providing improved object detection based on images or other on sensor data. In particular, various embodiments may improve the operation of computing devices that process sensor information to improve object detection. Various embodiments may improve the operation of processors that process sensor information to provide a more efficient analysis of such sensor information. Various embodiments may improve the operation of processors that process sensor information by enabling the processing of a greater number of aspects of the sensor information for a more detailed and accurate analysis of the sensor information. Various embodiments may improve the processing of sensor information by a processor executing a neural network to generate more detailed and accurate analysis of sensor information.

In various embodiments, a sensor (e.g., of a vehicle) may capture sensor information regarding the environment around the sensor. For example, the sensor information may include light information from a camera, which may include information about light having a detected intensity at a detected angle or bearing. As another example, the sensor information may include radar or lidar information, which may include a detected signal having a distance, bearing, and intensity. In some embodiments, a processor may generate a "bird's eye view" of its environment from such information. Various embodiments may use other suitable sensor information without limitation.

In some embodiments, a processor within a vehicle control unit may generate a feature map based on the captured sensor information. In some embodiments, the feature map may include a plurality of features, aspects, values, or elements that the processor may analyze. In some embodiments, the feature map may include a plurality of pixels. In some embodiments, each pixel of the feature map may include or be associated with the plurality of features, aspects, values, or elements. In some embodiments, the processor may generate a plurality of feature maps based on sensor information captured from the environment. In some embodiments, the feature maps may be of varying resolution to provide varying levels of detail for analysis by the processor. For example, the processor may provide a more accurate detection of objects of different sizes in feature maps of different resolutions. In some embodiments, the processor may rapidly analyze each of the plurality of feature maps as further described below.

In some embodiments, the processor within the vehicle control unit may associate a prior box with each pixel of the feature map, the prior box including a defined center value, a set of height priors, and a set of width priors. The set of height priors and the set of width priors provide the prior box with a variety of options for the size of the prior box. The set of height priors typically includes two or more height values, and the set of width priors typically includes two or more width values. In some embodiments, the prior box may not include a pre-defined size (i.e., a pre-defined height and width). In some embodiments, the prior box may include a set of one or more additional priors. Such additional priors may include values for a continuous quantity, for example, orientation, velocity, or other suitable values.

In some embodiments, during a training process, the processor within the vehicle control unit may execute a neural network that is configured with a plurality of prior boxes that include, for example, a defined center value, a set of height priors, and a set of width priors. In some embodiments, the neural network may be provided with a labeled training data set that includes training examples. The processor executing the neural network may process the training data, thereby configuring the processor to analyze and provide a variety of predictions about previously unseen sensor information. For example, in a real-time or real world environment, the processor may execute the neural network to rapidly process sensor information (or feature maps generated from such sensor information).

In some embodiments, the processor within the vehicle control unit may calculate for each prior box one or more object classifications and a confidence value for each of the object classifications. For example, the processor may determine one or more identifications or classifications for an object (e.g., person, automobile, sign, etc.). The processor may determine a confidence value for each of the classifications (e.g., a percentage confidence). In some embodiments, the processor may select for each prior box the object classification with the highest confidence value.

In some embodiments, the processor within the vehicle control unit may determine for each prior box a center value refinement. In some embodiments, the processor may refine the center value for each prior box based on the determined center value refinement.

In some embodiments, the processor within the vehicle control unit may determine a confidence value of each width prior and a confidence value of each height prior. For example, the processor may determine a percentage confidence value of each width prior and each height prior for the prior box. In some embodiments, the processor may determine a confidence value for each additional prior. The confidence value for each additional prior may include, for example, a percentage confidence value.

In some embodiments, the processor within the vehicle control unit may determine a height refinement value for each of the set of height priors. In some embodiments, the processor may determine a width refinement value for each of the set of width priors based on the feature map. In some embodiments, the processor may determine a width refinement value for each of the set of width priors based on one or more feature maps. For example, the processor may determine the width refinement values based on one or more aspects of an object represented in the feature map. In some embodiments, the processor may determine a refinement value for each additional prior of each set of additional priors. In some embodiments, the processor may determine the height refinement values and the width refinement values based on the feature map.

In some embodiments, the processor within the vehicle control unit may select for each prior box a highest confidence height prior from among the set of height priors. In some embodiments, the processor may select for each prior box a highest confidence width prior from among the set of width priors. In some embodiments, the processor may select for each prior box a highest confidence value for each additional prior from among each set of additional priors. In some embodiments, the processor may refine the highest confidence height prior with the determined height refinement value. In some embodiments, the processor may refine the highest confidence width prior with the determined width refinement value. In some embodiments, the processor may refine the highest confidence additional prior(s) with the determined refinement value for each additional prior.

In some embodiments, the within the vehicle control unit processor may output for each pixel of the feature map a proposed detection that includes the refined center value, the refined highest confidence height, the refined highest confidence width, and the highest confidence object classification. In some embodiments, the proposed detection may also include the refined additional one or more priors.

In some embodiments, since the processor associates a prior box with each pixel of the feature map, for a single object the processor may produce multiple corresponding proposed detections. In some embodiments, the processor may perform an operation to suppress multiple detections, such as non-maximum suppression. In some embodiments the processor may calculate an overlap of a highest confidence proposed detection with other proposed detections, and may remove or ignore lower confidence proposed detections that overlap too much with the highest confidence proposed detection (e.g., more than a threshold overlap), as they are likely to be detections of the same object. In some embodiments, the processor may regard the highest confidence proposed detection as the most reliable or most accurate proposed detection. The processor may repeat this process this until reaching a point where out of the remaining proposed detections, the highest confidence is lower than a threshold confidence value. In some embodiments, the proposed detection that is output for many pixels of the feature map may include an indication of a detected object of sufficiently low confidence to indicate that no object may be present in the proposed detection. In some embodiments, the processor may select one or more proposed detections having an overall confidence that is above the threshold confidence. In some embodiments, the processor may remove or ignore those proposed detections having an overall confidence that is below the confidence threshold. In some embodiments, this operation may result in the elimination of many or most of the proposed detections.

In some embodiments, the processor within the vehicle control unit may output a final detection indication (i.e., a final indication of a detected object). In various embodiments, the processor may provide a plurality of final indications of detected objects (e.g., detecting multiple objects) for each frame of sensor information received by the processor. In some embodiments, as noted above, the processor may generate a plurality of feature maps based on the sensor information. In some embodiments, the feature maps may be of varying resolution to provide varying levels of detail for analysis by the processor. For example, the processor may provide a more accurate detection of objects of different sizes in feature maps of different resolutions. In some embodiments, the processor may rapidly analyze each of the plurality of feature maps. The final detection may be based on an analysis of the plurality of feature maps using the operations described above.

In some embodiments, the processor within the vehicle control unit may perform a vehicle operation based on the output indication of a detected object (i.e., the final detection). For example, the processor may plan or perform a vehicle maneuver or operation based on the final detection. As another example, the processor may generate a command or signal to a vehicle controller to cause the vehicle to turn, speed up or slow down to avoid an obstacle, follow another vehicle, etc.

In various embodiments, the sensor may capture sensor information regarding the environment around the sensor, and may generate a feature map based on the sensor information. In some embodiments, the operations of capturing sensor information and generating a feature map may be similar to such operations as described above.

In some embodiments, the processor within the vehicle control unit may associate one or more prior boxes with each pixel of the feature map, the prior box including a center value, a size value (e.g., a height and a width), and a set of orientation priors. The set of orientation priors may include two or more orientation values.

In some embodiments, the processor within the vehicle control unit may calculate for each prior box one or more object classifications and a confidence value for each of the object classifications. In some embodiments, the processor may select for each prior box the object classification with the highest confidence value.

In some embodiments, the processor within the vehicle control unit may determine for each prior box a center value refinement. In some embodiments, the processor may refine the center value for each prior box based on the determined center value refinement.

In some embodiments, the processor within the vehicle control unit may determine an orientation refinement for each orientation prior of the set of orientation priors. In some embodiments, the processor may determine the orientation refinements based on the feature map.

In some embodiments, the processor within the vehicle control unit may select for each prior box a highest confidence orientation prior from among the set of orientation priors. In some embodiments, the processor may refine the highest confidence orientation prior with the determined orientation refinement value. In some embodiments, the processor may rotate each prior box based on the refined orientation value.

In some embodiments, the processor within the vehicle control unit may output one or more proposed detections including the refined center value, the refined size, the highest confidence orientation, and the highest confidence object classification.

In some embodiments, the processor within the vehicle control unit may perform an operation to reduce or eliminate duplicate detections substantially as described above. As noted above, since the processor associates one or more prior boxes with each pixel of the feature map, for a single object the processor may produce multiple corresponding proposed detections. The processor may perform an operation to suppress multiple detections, such as non-maximum suppression. In some embodiments the processor may calculate an overlap of a highest confidence proposed detection with other proposed detections, and the processor may remove or ignore lower confidence proposed detections that overlap too much with the highest confidence proposed detection (e.g., more than a threshold overlap), as they are likely to be detections of the same object. In some embodiments, the processor may regard highest confidence proposed detection as the most reliable or most accurate proposed detection. The processor repeats this until reaching a point where out of the remaining proposed detections, the highest confidence is lower than a threshold confidence value. In some embodiments, the proposed detection that is output for many pixels of the feature map may include an indication of a detected object of sufficiently low confidence to indicate that no object may be present in the proposed detection. In some embodiments, the processor may select one or more proposed detections having an overall confidence that is above the threshold confidence. In some embodiments, the processor may remove or ignore those proposed detections having an overall confidence that is below the confidence threshold. In some embodiments, this operation may result in the elimination of many or most of the proposed detections.

Said another way, as the network outputs a set number of detection proposals at all times, it will happen that a given single object has multiple corresponding detection proposals. To eliminate these duplicates, the processor may perform additional steps, including well known algorithms, such as non-maximum suppression.

In some embodiments, the processor within the vehicle control unit may output a final detection (i.e., a final indication of a detected object). In various embodiments, the processor may provide a plurality of final indications of detected objects (e.g., may detect multiple objects) for each frame of sensor information received by the processor. In some embodiments, as noted above, the processor may generate a plurality of feature maps based on the sensor information. The feature maps may be of varying resolution to provide varying levels of detail for analysis by the processor. For example, the processor may provide a more accurate detection of objects of different sizes in feature maps of different resolutions. In some embodiments, the processor may rapidly analyze each of the plurality of feature maps. In some embodiments, the final detection may be based on an analysis of the plurality of feature maps using the operations described above.

In some embodiments, the processor within the vehicle control unit may perform a vehicle operation based on the output indication of a detected object (i.e., the final detection). For example, the processor may plan or perform a vehicle maneuver or operation, such as turn, speed up or slow down, based on the final detection. As vehicle sensors may output sensor information at a high frame rate (e.g., up to 50 frames per second or more), the processor may use the output indication of a detected object over a number of frames of sensor information to determine an appropriate vehicle maneuver or operation. For example, the output indication of a detected object from several frames of sensor information may be combined to further improve the confidence in detections of objects before the processor takes an action based on the combination of output indication of detected objects.

Various embodiments improve the operation of computing devices and processors configured to perform object detection, and improve the operation of autonomous and semiautonomous vehicles including such computing devices and/or processors. Providing prior boxes with sets of priors enables more efficient analysis of sensor information in a manner that scales linearly, and thus avoids a combinatorial explosion of complexity. Various embodiments enable a processor to analyze more features of sensor information, providing a more accurate object detection. Various embodiments provide an extensible method of processing sensor information, by enabling the addition of a set (or sets) of priors for nearly any property to a prior box (e.g., orientation, velocity, and other suitable features), while avoiding a combinatorial explosion during analysis. By adding priors to a prior box (e.g., enabling the use of a greater number of shape classes or prior shapes), various embodiments shift determinations to classifiers and decrease refinement determinations.

Various embodiments may more efficiently use a training signal (e.g., training data) provided to a neural network. For example, in conventional SSD only matching prior boxes learn from the training signal, and no learning is propagated to other prior boxes. For example, if a training image includes an object that is 5 units wide and 2 units long (i.e., a 5×2 shape) in the image, in conventional SSD, only matched prior boxes will learn from the example object. While there may be multiple matching boxes—for example, 5×2, 5×3, 4×2, and other similar closely matching boxes—a 5×10 prior box will not learn anything about how a 5 units wide object appears, even though a 5×10 prior box is also 5 units wide. In contrast, in various embodiments all prior boxes learn (i.e., are trained) from the training signal/data.

Figure 1B:
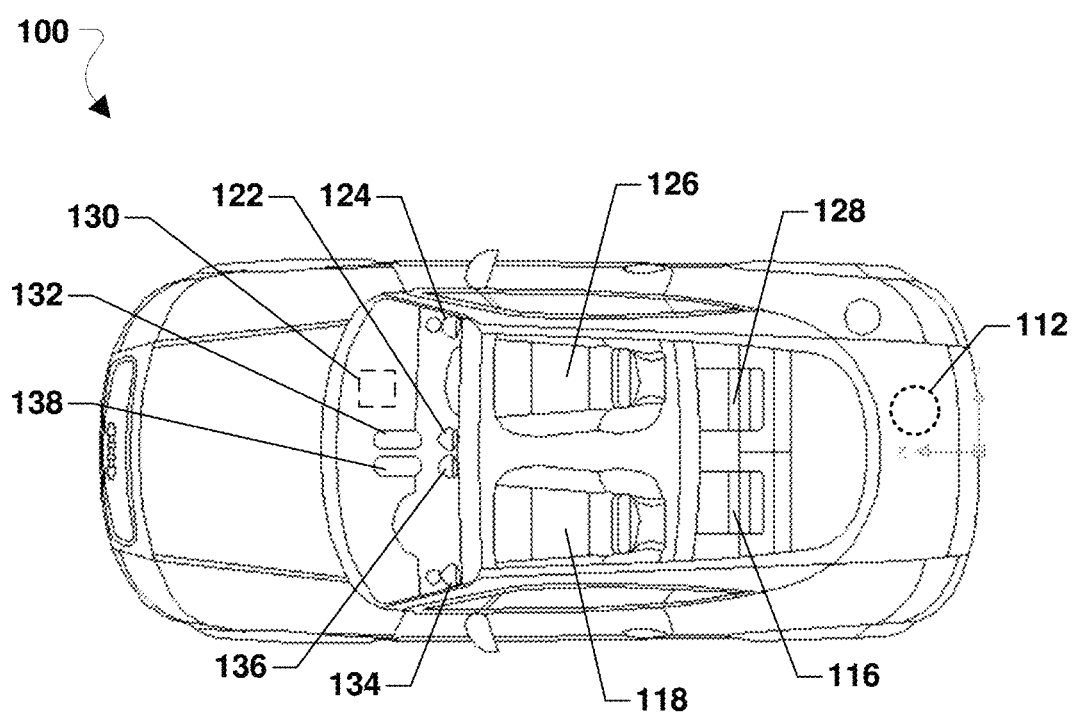

Various embodiments may be implemented within a variety of vehicles, an example vehicle 100 of which is illustrated in FIGS. 1A and 1B. With reference to FIGS. 1A and 1B, the vehicle 100 may include a plurality of sensors 102-138 disposed in or on the vehicle that are used for various purposes involved in autonomous and semiautonomous navigation as well as sensor data regarding objects and people in or on the vehicle 100. The sensors 102-138 may include one or more of a wide variety of sensors capable of detecting a variety of information useful for environment detection, maneuvering, navigation, collision avoidance, and other vehicle operations. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136, the radar 132, and/or the lidar 138. In some embodiments, the control unit 140 may supplement the processing of camera images using distance and relative position (e.g., relative bearing angle) that may be obtained from radar 132 and/or lidar 138 sensors. The control unit 140 may further be configured to control steering, braking, and speed of the vehicle 100 when operating in an autonomous or semiautonomous mode using information regarding other vehicles determined using various embodiments.

Figure 1C:
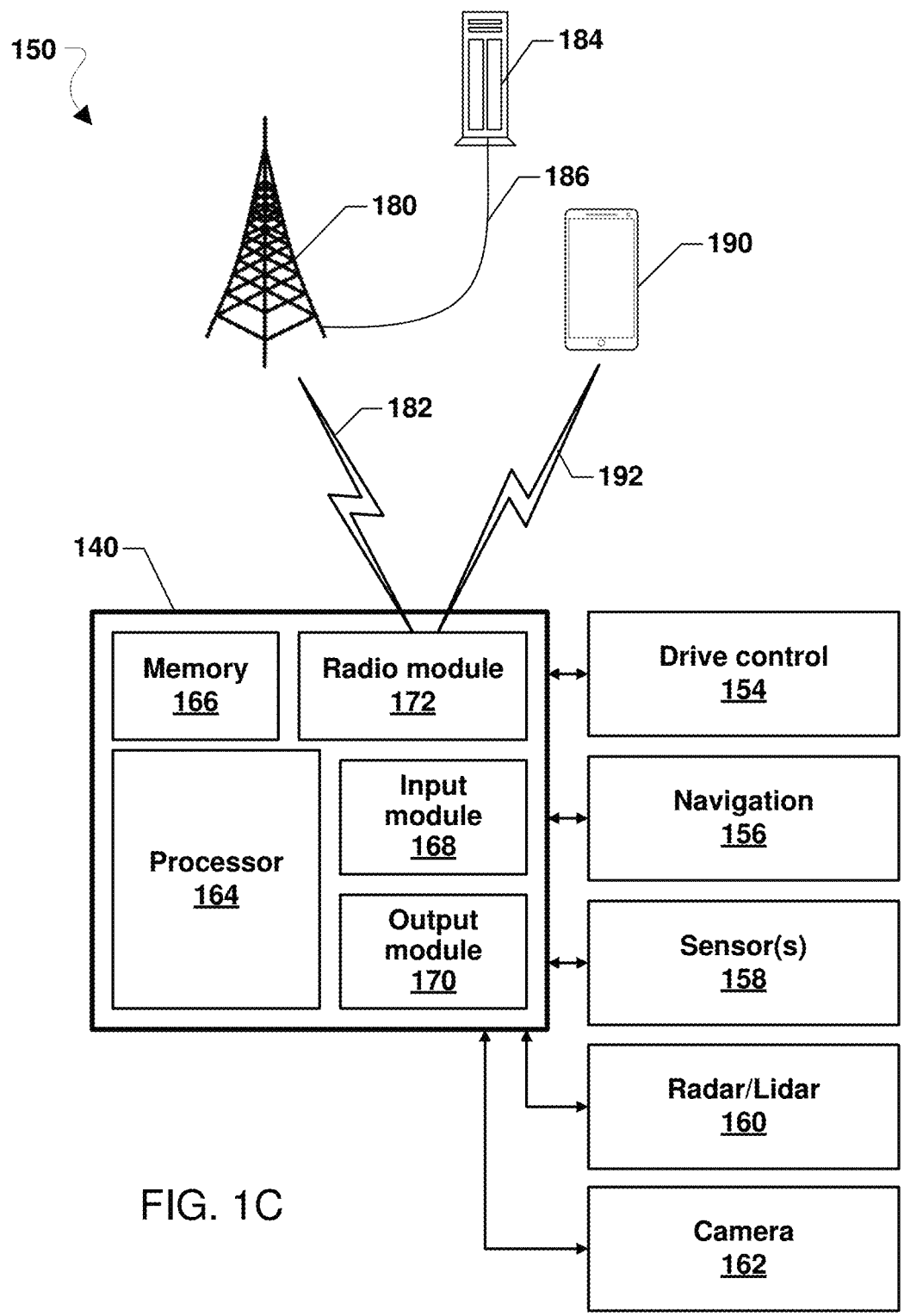
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. The control unit 140 may be coupled to and configured to control drive control components 154, navigation components 156, radar/lidar components 160, camera components 162, and one or more other sensors 158 of the vehicle 100.

As used herein, the terms "component," "system," "unit," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 configured with processor-executable instructions to control maneuvering, navigation, and other operations of the vehicle 100, including operations of various embodiments. The processor 164 may be coupled to a memory 166. The control unit 162 may include an input module 168, an output module 170, and a radio module 172.

The radio module 172 may be configured for wireless communication.

The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), and other similar devices.

The control unit 140 may be coupled to the navigation components 156, and may receive data from the navigation components 156 and be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may be configured to provide a variety of data to the processor 164. The control unit 140 may be coupled to the radar/lidar components 160 and/or to the camera components 162 to control the operation of and to receive sensor information from the radar/lidar components 160 and/or the camera components 162, as well as to provide such sensor information to the processor 164.

While the control unit 140 is described as separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2:
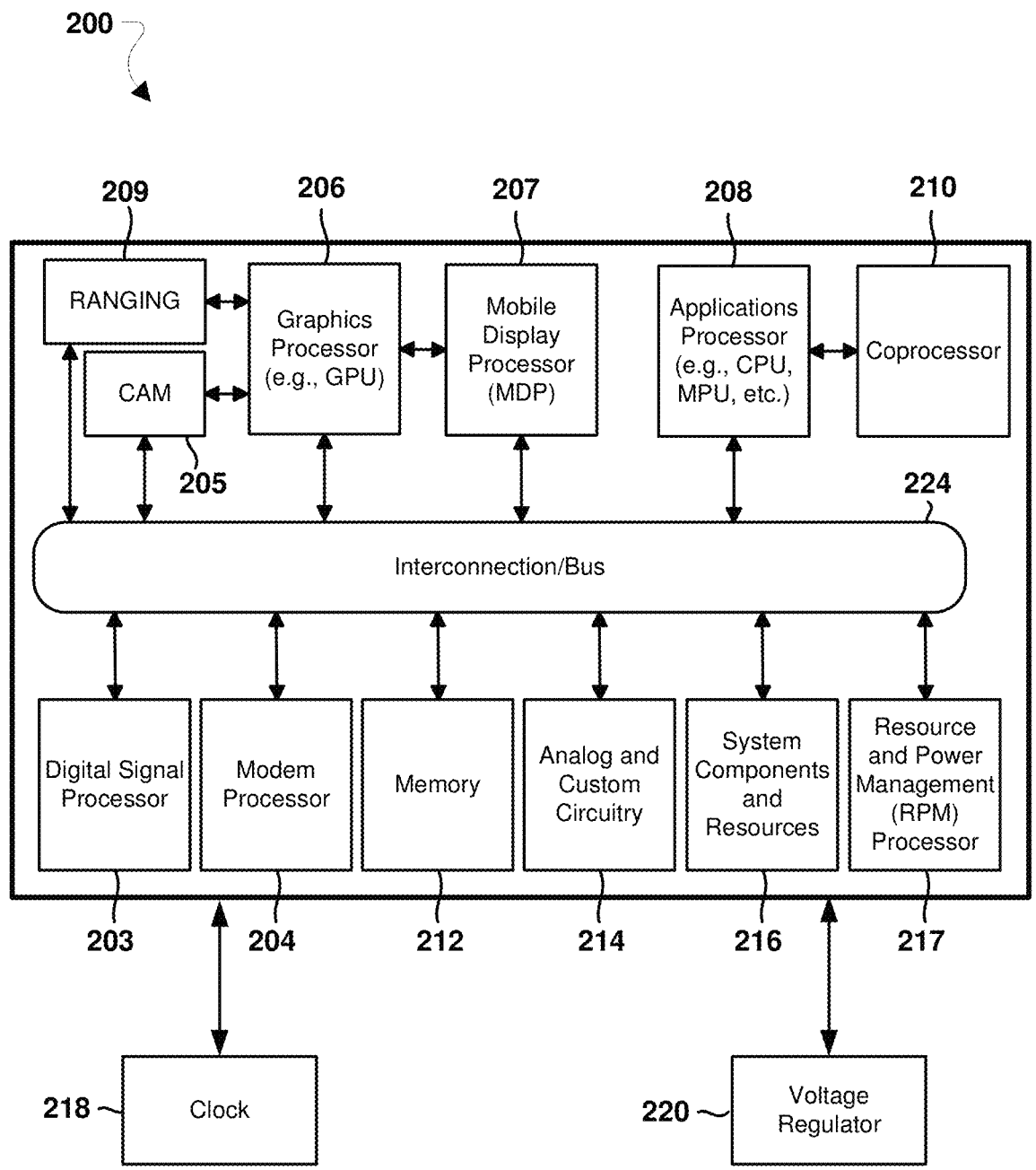
FIG. 2 is a block diagram illustrating components of an example system on chip for use in a vehicle that may be configured to collect and analyze sensor information in accordance with various embodiments.

FIG. 2 illustrates an example system-on-chip (SOC) architecture of a processing device SOC 200 suitable for implementing various embodiments. With reference to FIGS. 1A-2, the processing device SOC 200 may include a number of heterogeneous processors, such as a digital signal processor (DSP) 203, a modem processor 204, an image processor 206, a mobile display processor (MDP) 207, an applications processor 208, and a resource and power management (RPM) processor 217. The processing device SOC 200 may also include one or more coprocessors 210 (e.g., vector co-processor) connected to one or more of the heterogeneous processors 203, 204, 206, 207, 208, 217. Each of the processors may include one or more cores, and an independent/internal clock. Each processor/core may perform operations independent of the other processors/cores. For example, the processing device SOC 200 may include a processor that executes a first type of operating system (e.g., FreeBSD, LINUX, OS X, etc.) and a processor that executes a second type of operating system (e.g., Microsoft Windows). In some embodiments, the applications processor 208 may be the SOC's 200 main processor, central processing unit (CPU), microprocessor unit (MPU), arithmetic logic unit (ALU), etc. The graphics processor 206 may be graphics processing unit (GPU).

The processing device SOC 200 may include analog circuitry and custom circuitry 214 for managing sensor data, analog-to-digital conversions, wireless data transmissions, and for performing other specialized operations, such as processing encoded audio and video signals for rendering in a web browser. The processing device SOC 200 may further include system components and resources 216, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 200 may also include specialized camera control circuitry (CAM) 205 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 205 may be an independent processing unit and/or include an independent or internal clock.

The processing device SOC 200 also include specialized ranging device control circuitry (RANGING) 205 that includes, provides, controls and/or manages the operations of one or more components such as the radar 132, the lidar 138, and other suitable devices (e.g., a source/emitter, detector, and scanning components, timing electronics, orientation and location determining components, etc.). The RANGING device 209 may be an independent processing unit and/or include an independent or internal clock.

In some embodiments, the image processor 206 may be configured with processor-executable instructions and/or specialized hardware configured to perform image processing analyses involved in various embodiments. For example, the image processor 206 may be configured to perform operations of receiving and processing sensor information received from cameras (e.g., 122, 136) via the CAM 205 and or from a radar or lidar system (e.g., 132, 138) for provision to an object detection system.

The system components and resources 216, analog and custom circuitry 214, CAM 205, and/or RANGING 209 may include circuitry to interface with peripheral devices, such as cameras 122, 136 electronic displays, wireless communication devices, external memory chips, etc. The processors 203, 204, 206, 207, 208 may be interconnected to one or more memory elements 212, system components and resources 216, analog and custom circuitry 214, CAM 205, RANGING 209, and RPM processor 217 via an interconnection/bus module 224, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 200 may further include an input/output module (not illustrated) for communicating with resources external to the SOC, such as a clock 218 and a voltage regulator 220. Resources external to the SOC (e.g., clock 218, voltage regulator 220) may be shared by two or more of the internal SOC processors/cores (e.g., a DSP 203, a modem processor 204, a graphics processor 206, an applications processor 208, etc.).

In some embodiments, the processing device SOC 200 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 200 may also include additional hardware and/or software components that are suitable for collecting sensor data from sensors, including motion sensors (e.g., accelerometers and gyroscopes), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 3A:
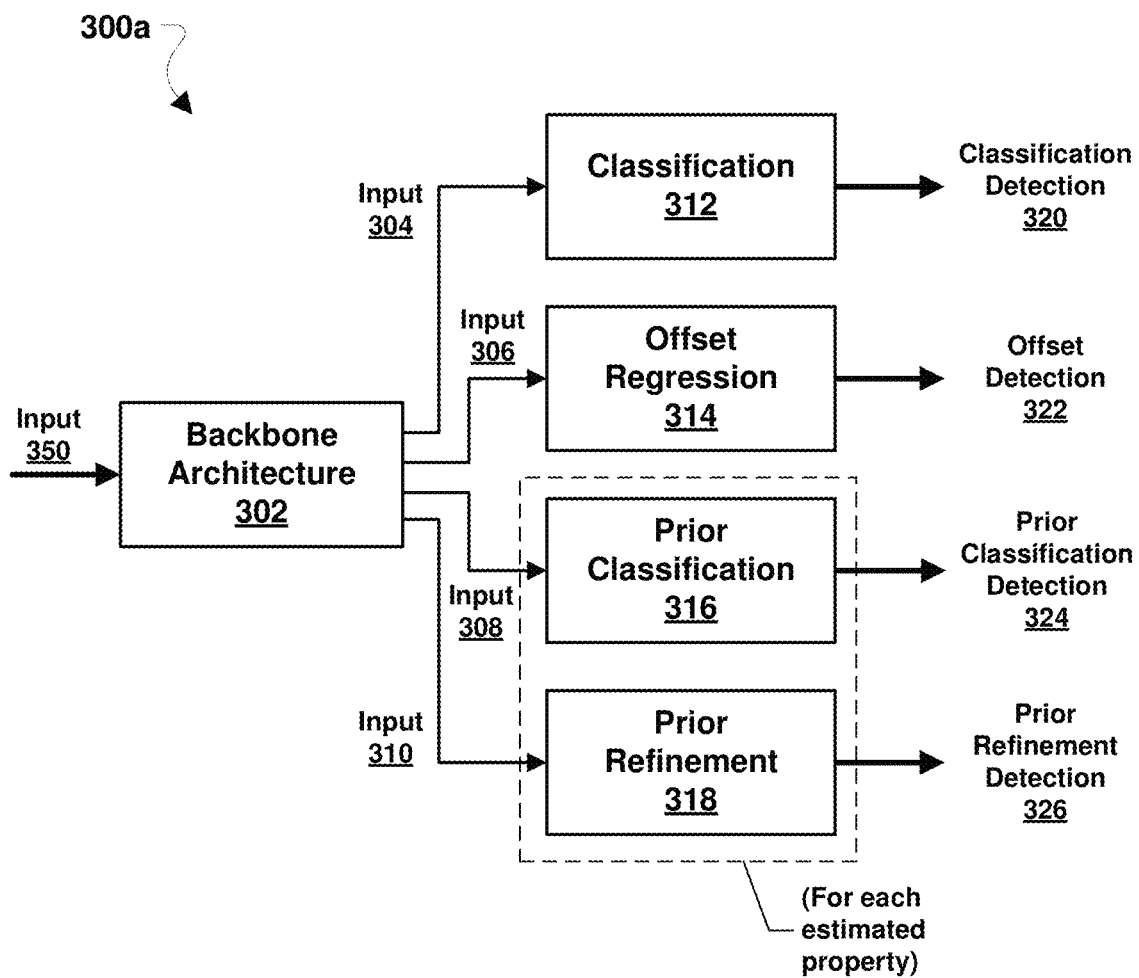
FIGS. 3A and 3B are block diagrams illustrating components of a neural network architecture suitable for performing object detection from sensor information in accordance with various embodiments.
Figure 3B:
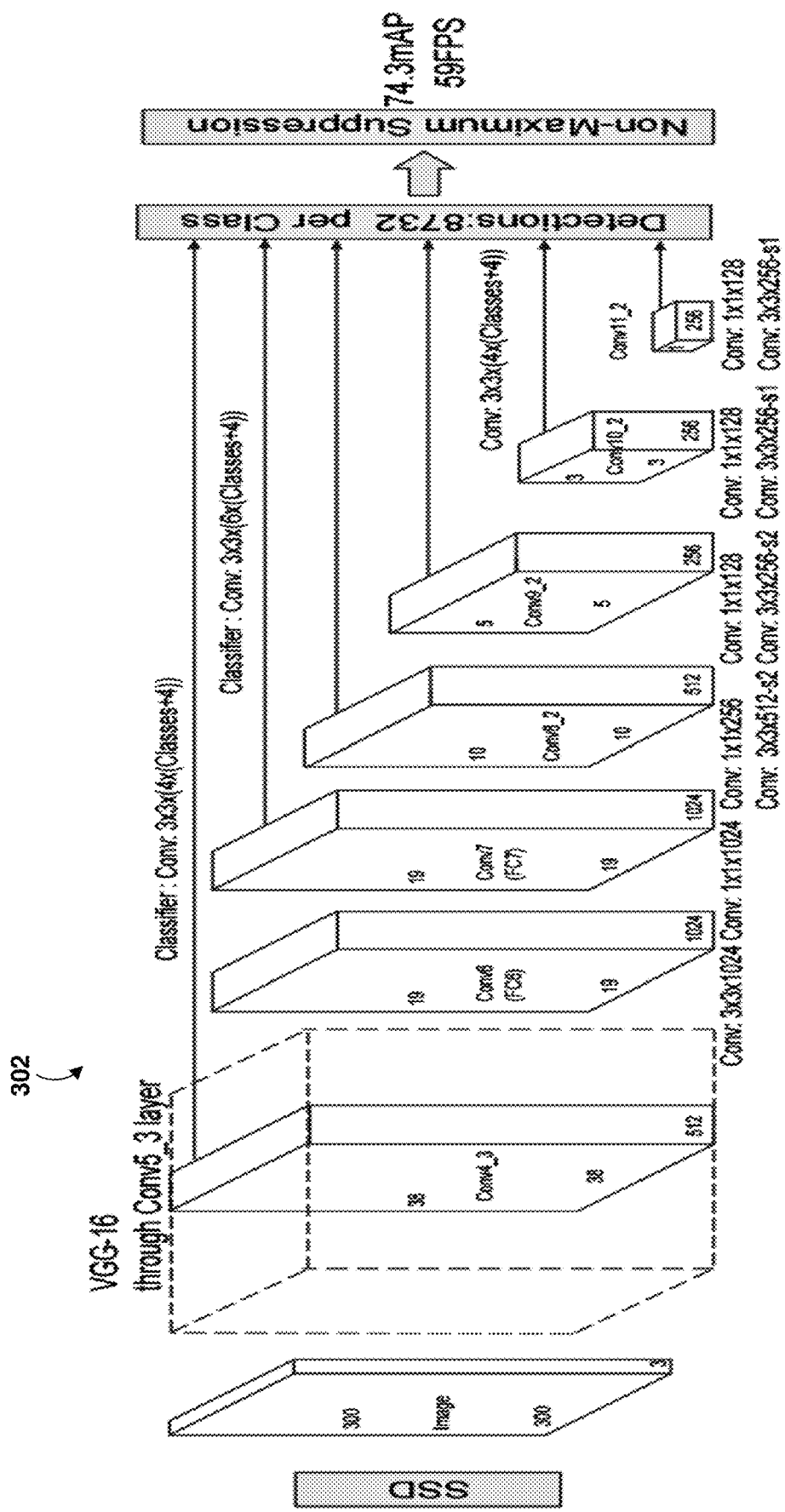

FIGS. 3A and 3B illustrates components of a neural network architecture 300a suitable for performing object detection from sensor information using the various embodiments. With reference to FIGS. 1A-3B, a backbone neural network architecture 302 receives an input 350, such as sensor information from a camera, radar, lidar, etc., and performs processing on the input to generate, among the things, various inputs to various classification heads or classification modules. For example, the backbone architecture 302 may provide input 304 to a classification head 312, and input 306 to an offset regression module 314. Further, the backbone architecture 302 may provide input 308 to a prior classification head 316 and input 310 to a prior refinement head 318, for each feature or property being estimated (e.g., height priors, width priors, orientation priors, velocity priors, and other suitable priors). The classification head 312 may output a classification 320 for each prior box (which may include one or more classifications). The offset regression module 314 may output an offset refinement 322 for each prior box (e.g., a center refinement value that a processor may use to refine the center of a prior box, as further described below). For each feature or property being estimated, the prior classification head 316 may output a prior property classification 324 for each prior box (which may include one or more classifications). The prior refinement head 318 may output a prior property refinement 326 (which may include one or more refinements). The prior property refinement 326 may include a refinement value for any of the priors (e.g., a height prior refinement value, a width prior refinement value, an orientation prior refinement value, a velocity prior refinement value, etc.) that a processor may use to refine the value of one or more priors, as further described below.

In various embodiments, the backbone architecture 302 may be followed by an SSD "feed-forward" convolutional network that produces a fixed-size collection of bounding boxes and scores for the presence of object class instances in those boxes, followed by a non-maximum suppression step to produce the final detections. In some embodiments, early network layers may be based on a standard architecture used for high quality image classification (truncated before any classification layers). Various embodiments may add auxiliary structure, (e.g., the classification head 312, the offset regression module 314, the prior classification head 316, and the prior refinement head 318) to the SSD to produce desired detections, as further described below.

FIG. 3B illustrates an example of the backbone neural network architecture 302. Neural networks (e.g., the backbone architecture 302) are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer. Each layer of a neural network specifies one or more transformation operations to be performed on input to the layer. Some neural network layers have operations that are referred to as neurons. Each neuron receives one or more inputs and generates an output that is received by another neural network layer. Each neuron may receive inputs from other neurons, and each neuron may provide an output to one or more other neurons.

The neural network architecture 302 specifies layers that are included in the network and their properties, as well as how the neurons of each layer of the network are connected, to specify which layers provide their output as input to which other layers and how the output is provided. A processor (e.g., the processor 164, 203-210, 217) may perform the transformation operations of each layer, e.g., implementing one or more software modules that enable the transformation operations. Thus, a layer being described as performing operations means that the processor(s) implementing the transformation operations of the layer perform the operations.

Each layer may generate one or more outputs using the current values of a set of parameters for the layer. Training the neural network 302 may involve continually performing a forward pass on the input, computing gradient values, and updating the current values for the set of parameters for each layer. Once the neural network 302 is trained, the final set of parameters may be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The neurons from which a neuron receives its input defines a receptive field for that neuron. Convolutional neural network layers may include one or more filters, which may be defined by parameters of the layer. A convolutional neural network layer may generate an output by performing a convolution of each neuron filter with a layer's input.

In addition, each convolutional network layer may include neurons in a three-dimensional arrangement, including, e.g., depth, width, and height dimensions. The width and height dimensions may correspond to two-dimensional features of a layer's input. The depth dimension may include one or more depth sublayers of neurons. In some embodies, convolutional neural networks may employ weight sharing so that all neurons in a depth sublayer have the same weights, to enable translation invariance when detecting features in the input. Convolutional neural networks may also include fully-connected layers and other kinds of layers. Neurons in fully-connected layers may receive input from each neuron in the previous neural network layer.

Figure 4A:
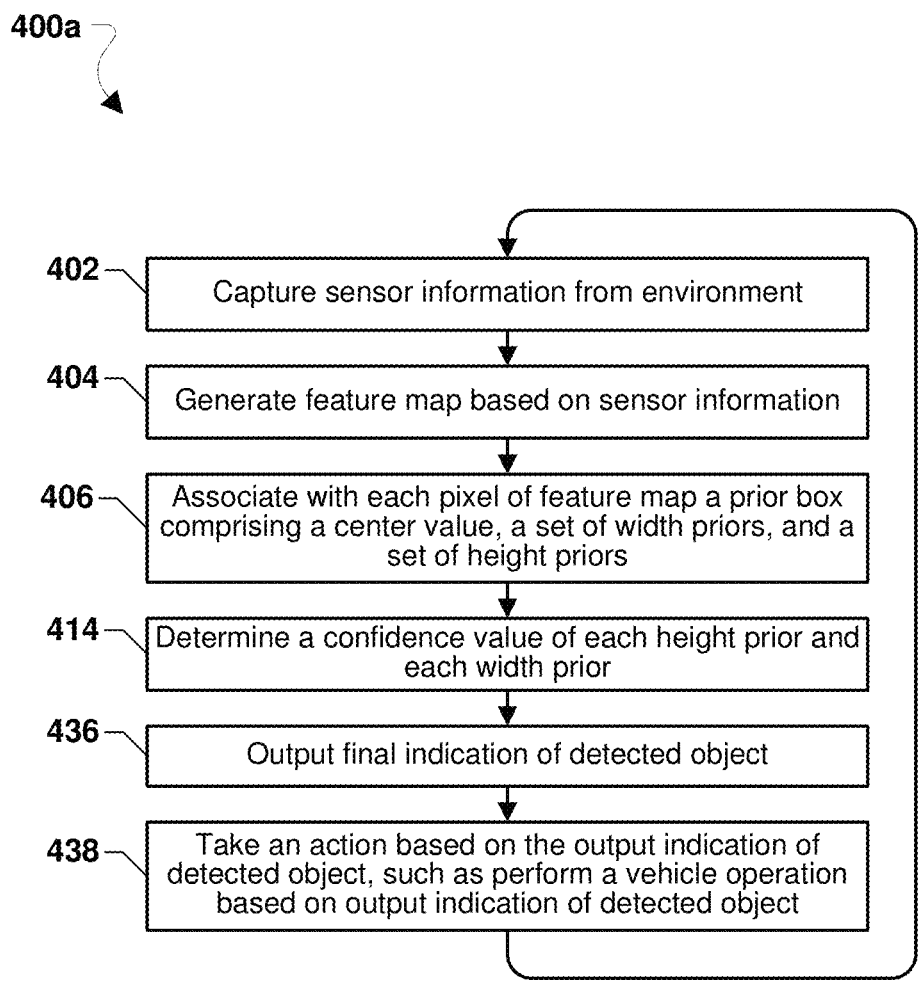
FIG. 4A is a process flow diagram illustrating an embodiment method of processing vehicle sensor information for object detection according to various embodiments.

FIG. 4A illustrates a method 400a of processing vehicle sensor information for object detection by a processor according to various embodiments. With reference to FIGS. 1A-4A, the method 400a may be implemented in a processor (e.g., 164), processing device (e.g., 200), and/or a control unit (e.g., 140) (variously referred to as a "processor") of a vehicle (e.g., 100). The order of operations performed in blocks 402-438 is merely illustrative, and the operations of blocks 402-438 may be performed in any order and partially simultaneously in various embodiments.

As further described below, in block 402, the processor may capture, by a sensor (e.g., a camera, radar, lidar, etc.), sensor information regarding the environment around the sensor. For example, the sensor information may include an image or light information captured by a camera, which may include information about light having a detected intensity at a detected angle or bearing. As another example, the captured sensor information may include radar or lidar information, which may include a detected signal having a distance, bearing, and intensity.

In block 404, the processor may generate a feature map based on the sensor information. In some embodiments, the processor may generate the feature map to include a plurality of features, aspects, values, or elements extracted from the sensor data captured in block 402 into a format that the processor may analyze. In some embodiments, each pixel of the feature map may include or be associated with the plurality of features, aspects, values, or elements. In some embodiments, the processor may generate a plurality of feature maps based on sensor information captured from the environment in block 402. In some embodiments, the processor may generate feature maps of varying resolution to provide varying levels of detail for analysis by the processor. For example, the processor may provide a more accurate detection of objects of different sizes in feature maps of different resolutions.

In block 406, the processor may associate with each pixel of the feature map to a prior box including a center value, a set of two or more width priors, and a set of two or more height priors. The set of height priors and the set of width priors may provide the prior box with a variety of options for the size of the prior box. The set of height priors may include two or more height values, and the set of width priors typically may include two or more width values. In some embodiments, the prior boxes may not have a pre-defined size (i.e., a pre-defined height and width). In some embodiments, the prior box may include a set of one or more additional priors. Such additional priors may include values for a continuous quantity, for example, orientation, velocity, or other suitable values.

In block 414, the processor may determine a confidence value of each height prior and each width prior. For example, the processor may determine a percentage confidence value of each width prior and each height prior for the prior box. In some embodiments, the processor may determine a confidence value for each additional prior. The confidence value for each additional prior may include, for example, a percentage confidence value.

In block 436, the processor may output a final indication of a detected object. In some embodiments, the output indication of a detected object may be based on a highest confidence height prior from among the set of height priors and a highest confidence width prior from among the set of width priors.

In block 438, the processor may take an action based on the output indication of a detected object, such as perform a vehicle operation based on the output indication of a detected object in embodiments implemented on a vehicle. For example, the processor may perform an action that results in the changing direction, such as to avoid an obstacle or to follow another vehicle. In many cases, the processor may take an action based on the output indication of a detected object over a number of frames of sensor information as the operations in the method 400a may be repeated many times per second (e.g., 50 times per second or more). Thus, the output indication of a detected object from several frames of sensor information may be combined to further improve the confidence in detected objects before the processor takes an action based on the combination of output indication of detected objects.

The processor may again capture sensor information regarding the environment in block 402.

Figure 4B:
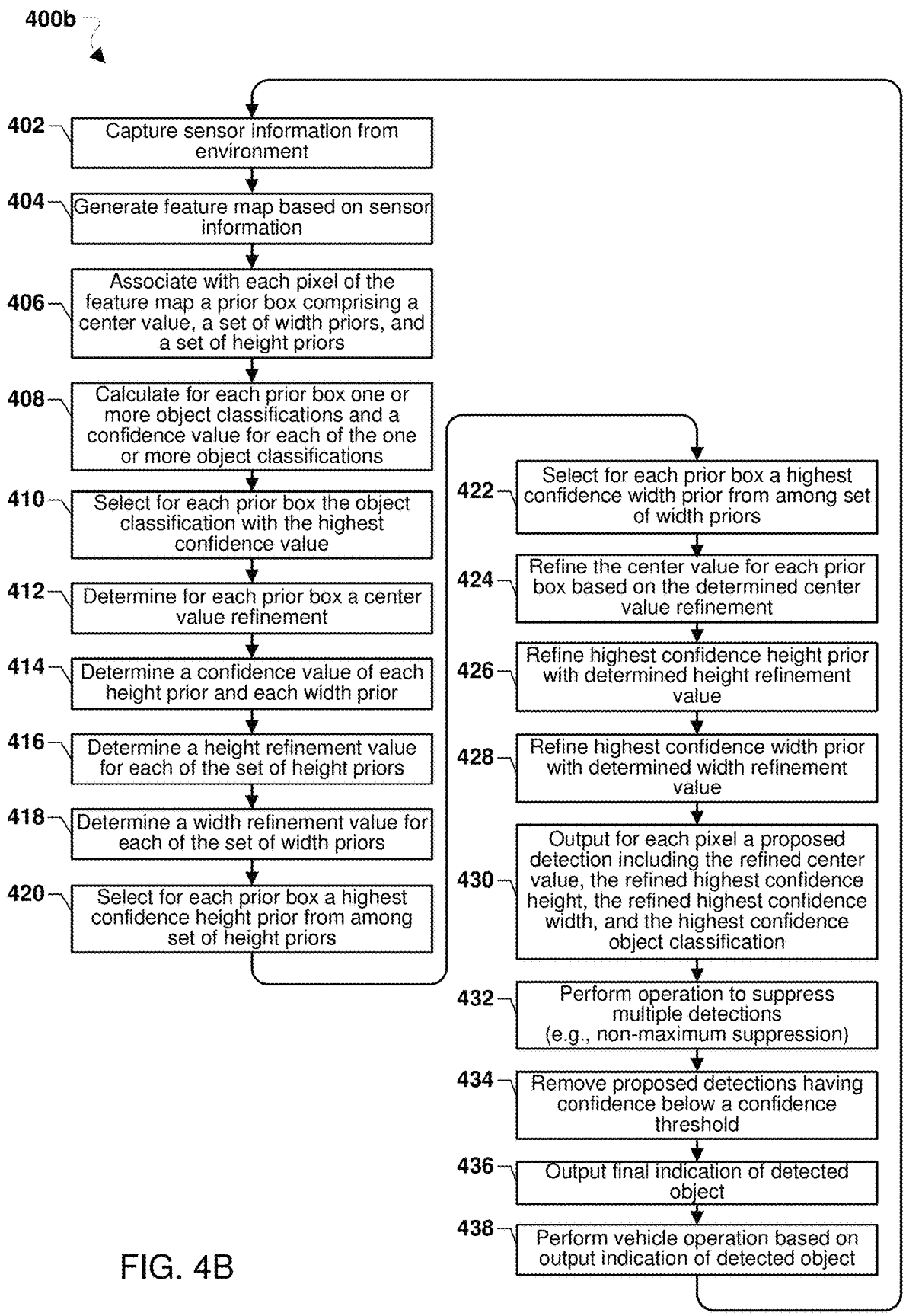
FIG. 4B is a process flow diagram illustrating an embodiment method of processing vehicle sensor information for object detection according to various embodiments.

FIG. 4B illustrates a method 400b of processing vehicle sensor information for object detection by a processor according to various embodiments. With reference to FIGS. 1A-4B, the method 400a may be implemented in a processor (e.g., 164), processing device (e.g., 200), and/or a control unit (e.g., 140) (variously referred to as a "processor") of a vehicle (e.g., 100). The order of operations performed in blocks 402-438 is merely illustrative, and the operations of blocks 402-438 may be performed in any order and partially simultaneously in various embodiments.

In block 402, the processor may capture, by a sensor (e.g., a camera, radar, lidar, etc.), sensor information regarding the environment around the sensor as described for the like number block in the method 400a with reference to FIG. 4A.

In block 404, the processor may generate a feature map based on the sensor information as described for the like number block in the method 400a with reference to FIG. 4A.

In block 406, the processor may associate with each pixel of the feature map a prior box including a center value, a set of two or more width priors, and a set of two or more height priors as described for the like number block in the method 400a with reference to FIG. 4A.

In block 408, the processor may calculate for each prior box one or more object classifications and a confidence value for each of the one or more object classifications. For example, the processor may determine one or more identifications for an object (e.g., person, automobile, sign, etc.). The processor may determine a confidence value for each of the classifications (e.g., a percentage confidence).

In block 410, the processor may select for each prior box the object classification with the highest confidence value.

In block 412, the processor may determine for each prior box a center value refinement. In some embodiments, the processor may refine the center value for each prior box based on the determined center value refinement.

In block 414, the processor may determine a confidence value for each height prior and a confidence value for each width prior as described for the like number block in the method 400a with reference to FIG. 4A.

In block 416, the processor may determine a height refinement value for each of the set of height priors.

In block 418, the processor may determine a width refinement value for each of the set of width priors. In some embodiments, the processor may determine the height refinement values and the width refinement values based on the feature map generated in block 404.

In block 420, the processor may select for each prior box a highest confidence height prior from among the set of height priors.

In block 422, the processor may select for each prior box a highest confidence width prior from among the set of width priors.

In block 424, the processor may refine the center value for each prior box based on the determined center value refinement.

In block 426, the processor may refine of the highest confidence height prior with the determined height refinement value.

In block 428, the processor may refine the highest confidence width prior with the determined width refinement value.

In block 430, the processor may output for each pixel a proposed detection that includes the refined center value, the refined highest confidence height, the refined highest confidence width, and the highest confidence object classification.

In block 432, the processor may perform an operation to suppress multiple detections (e.g., non-maximum suppression).

In block 434, the processor may remove proposed detections having a confidence level below a confidence threshold. In some embodiments, the processor may perform the operations of block 434 as part of or together with the operations of block 432.

In block 436, the processor may output a final indication of a detected object as described for the like number block in the method 400a with reference to FIG. 4A. In some embodiments, the output indication of a detected object may be based on the highest confidence height prior from among the set of height priors and the highest confidence width prior from among the set of width priors.

In block 438, the processor may perform a vehicle operation based on the output indication of a detected object as described for the like number block in the method 400a with reference to FIG. 4A. The processor may perform a vehicle operation based on the output indication of a detected object over a number of frames of sensor information as the operations in the method 400b may be repeated many times per second (e.g., 50 times per second or more). Thus, the output indication of a detected object from several frames of sensor information may be combined to further improve the confidence in object detections before the processor takes an action based on the combination of output indication of a detected objects.

The processor may again capture sensor information regarding the environment in block 402.

Figure 5:
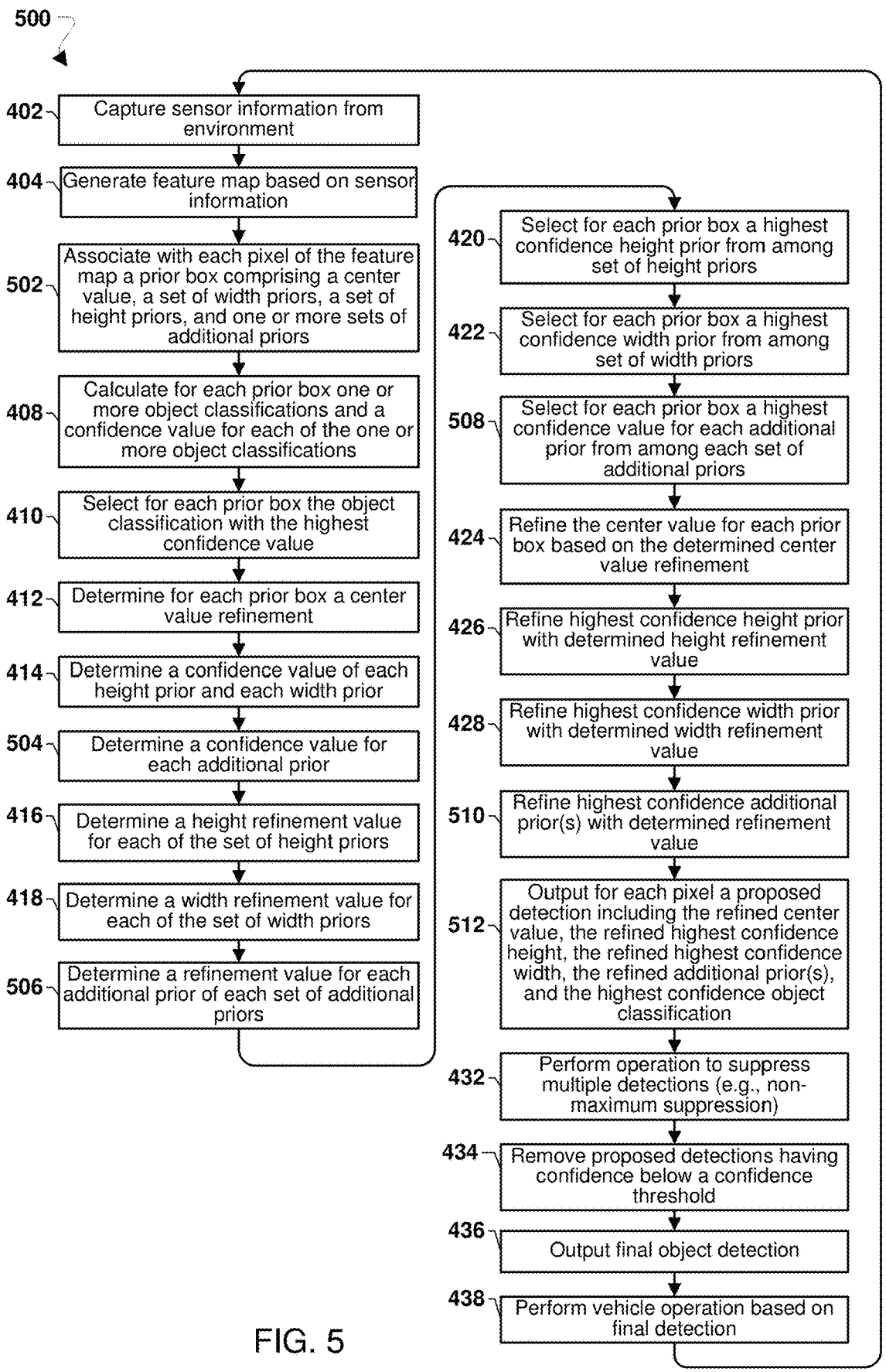
FIG. 5 is a process flow diagram illustrating an embodiment method of processing vehicle sensor information for object detection according to various embodiments.

FIG. 5 illustrates a method 500 of processing vehicle sensor information for object detection by a processor according to various embodiments. With reference to FIGS. 1A-5, the method 500 may be implemented in a processor (e.g., 164), processing device (e.g., 200), and/or a control unit (e.g., 140) (variously referred to as a "processor") of a vehicle (e.g., 100). The order of operations performed in blocks 402-438 and 502-512 is merely illustrative, and the operations of blocks 402-438 may be performed in any order and partially simultaneously in various embodiments. In blocks 402-438, the processor may perform operations of like-numbered blocks of the methods 400a and 400b as described.

In block 502, the processor may associate with each pixel of the feature map a prior box including a center value, a set of width priors, a set of height priors, and one or more sets of additional priors. In some embodiments, the additional priors may include values for a continuous quantity, for example, orientation, velocity, or other suitable values. In some embodiments, the prior boxes are extensible in that they may be configured with priors for any number of values or characteristics.

After performing operations in blocks 402 and 404 of the method 400a as described, in block 504, the processor may determine a confidence value for each additional prior. In some embodiments, the confidence value for each additional prior may include, for example, a percentage confidence value.

In block 506, the processor may determine a refinement value for each additional prior of each set of additional priors.

In block 508, the processor may select for each prior box a highest confidence value for each additional prior from among each set of additional priors.

In block 510, the processor may refine the highest confidence additional one or more priors with the determined refinement value for each prior.

In block 512, the processor may output for each pixel a refined prior box that includes the refine center value, the refined highest confidence height, the refined highest confidence width, the refined additional one or more priors, and the highest confidence object classification.

Figures 6A, 6B:
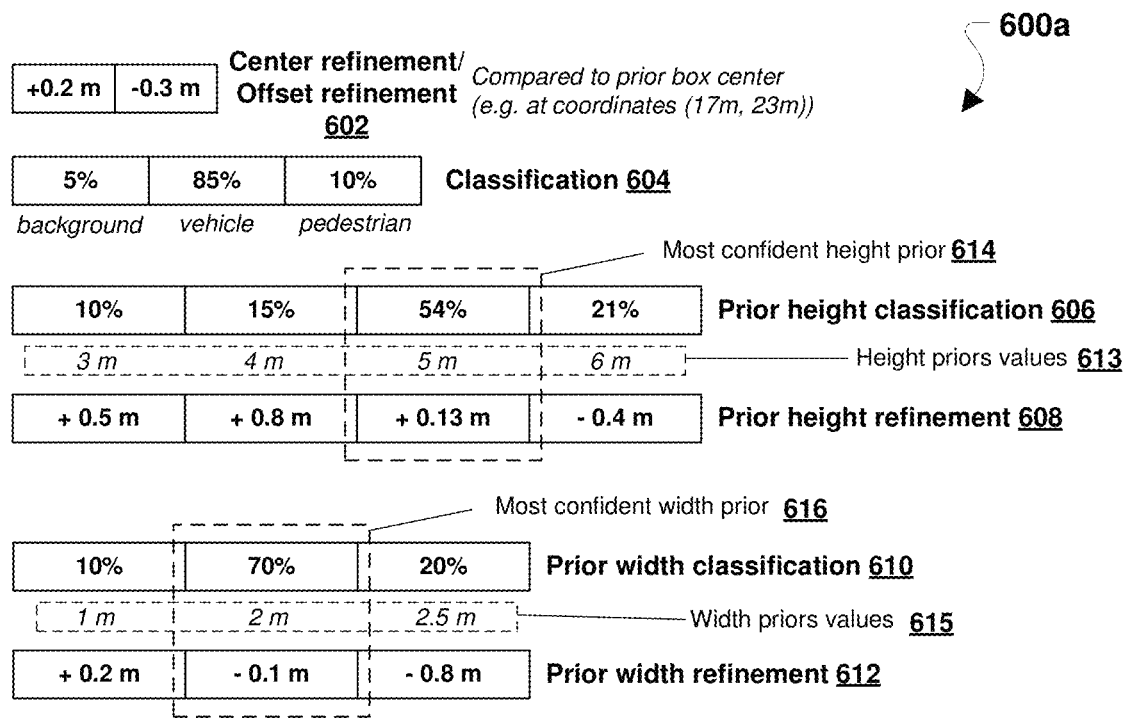
FIGS. 6A and 6B are diagrams illustrating outputs of a neural network performing object detection from sensor information according to various embodiments.

FIG. 6A illustrates output indications of detected objects 600a and FIG. 6B illustrates a final indication of a detected object 600b from a neural network performing object detection from sensor information according to various embodiments. With reference to FIGS. 1A-6B, the neural network may be implemented in a processor (e.g., 164), processing device (e.g., 200), and/or a control unit (e.g., 140) (variously referred to as a "processor") of a vehicle (e.g., 100).

In some embodiments, the processor may output an indication of a detected object that includes a center refinement or offset refinement 602 (e.g., the offset detection 322). The processor may use the center refinement to refine center value for each prior box, as described above.

In some embodiments, the processor may output an indication of a detected object that includes a classification 604 for each prior box. For example, the classification may include one or more identifications of an object. The classification may also include a percentage confidence of each identification. For example, the classification 604 includes an identification of an object as part of an image background, a vehicle, and a pedestrian. The classification 604 may also include a confidence of each classification, for example, 5% confidence that the object is an image background, 85% confidence that the object is a vehicle, 10% confidence that the object is a pedestrian.

In some embodiments, the processor may output an indication of a detected object that includes one or more height priors 613. Each height prior 613 may include a height value (e.g., as illustrated, 3 m, 4 m, 5 m, and 6 m). The processor may output a confidence value of each height classification 606 (e.g., as illustrated, 10% confidence for 3 m, 15% confidence for 4 m, 54% confidence for 5 m, and 21% confidence for 6 m). In some embodiments, the processor executing the neural network may output an indication of a detected object that includes a series of values to which the processor may apply a function (for example, a Softmax function) that transforms the values into probabilities that sum to one. The processor may also output an indication of a detected object that includes one or more height refinement values (i.e., prior height refinement(s)) 608, which may correspond to the one or more height priors (e.g., +0.5 m, +0.8 m, −0.13 m, and −0.4 m). The processor may use the height refinement values to refine the highest confidence height classification, as further described below.

In some embodiments, the processor may output an indication of a detected object that includes one or more width priors 615. Each width prior 615 may include a weight value (e.g., as illustrated, 1 m, 2 m, and 2.5 m). The processor may output a confidence value of each width classification 610 (e.g., as illustrated, 10% confidence for 1 m, 70% confidence for 2 m, and 20% confidence for 2.5 m). In some embodiments, the processor executing the neural network may output an indication of a detected object that includes a series of values to which the processor may apply a function (for example, a Softmax function) that transforms the values into probabilities that sum to one. The processor may also output an indication of a detected object that includes one or more width refinement values (i.e., prior width refinement(s)) 612, which may correspond to the one or more width priors (e.g., +0.2 m, −0.1 m, and −0.8 m). The processor may use the width refinement values to refine the highest confidence width classification, as further described below.

In some embodiments, the processor may select the highest confidence height prior 614, and the highest confidence width prior 616.

Based on the output indications of a detected objects s 600a, the processor may output a final detection indication or information (e.g., a final indication of a detected object) 600b. The final indication of the detected object 600b may include a class/classification 620 of the object (e.g., a vehicle), which may reflect the highest confidence classification 604 (e.g., 85% confidence). The final indication of the detected object 600b may include a refined center of a prior box 622 (e.g., 17.2 m, 22.8 m, corresponding to a location within the sensor information). The refined center of the prior box 622 may be based on the center of the prior box, plus or minus the center refinement (or offset refinement). For example, the processor may refine a prior box center value of (17 m, 23 m) with values of the center refinement (+0.2 m, −0.3 m), to output a refined center value (17.2 m, 22.8 m). The final indication of the detected object 600b may include a refined highest confidence height prior 624 (e.g., 5.13 m). In some embodiments, the processor may refine a height prior value (e.g., 5 m) with the value of the corresponding prior height refinement value 608 (e.g., +0.13 m) to output the refined highest confidence height (e.g., 5.13 m). The final indication of the detected object 600b may include a refined highest confidence width prior 626 (e.g., 1.9 m). In some embodiments, the processor may refine a width prior value (e.g., 2 m) with the value of the corresponding prior width refinement value 612 (e.g., −0.1 m) to output the refined highest confidence width 626 (e.g., 1.9 m). The final indication of the detected object 600b may include a confidence of the highest confidence height prior 628 (e.g., 54%), a confidence of the class/classification 630 (e.g., 85%), and a confidence of the highest confidence width prior 632 (e.g., 70%).

Figure 7:
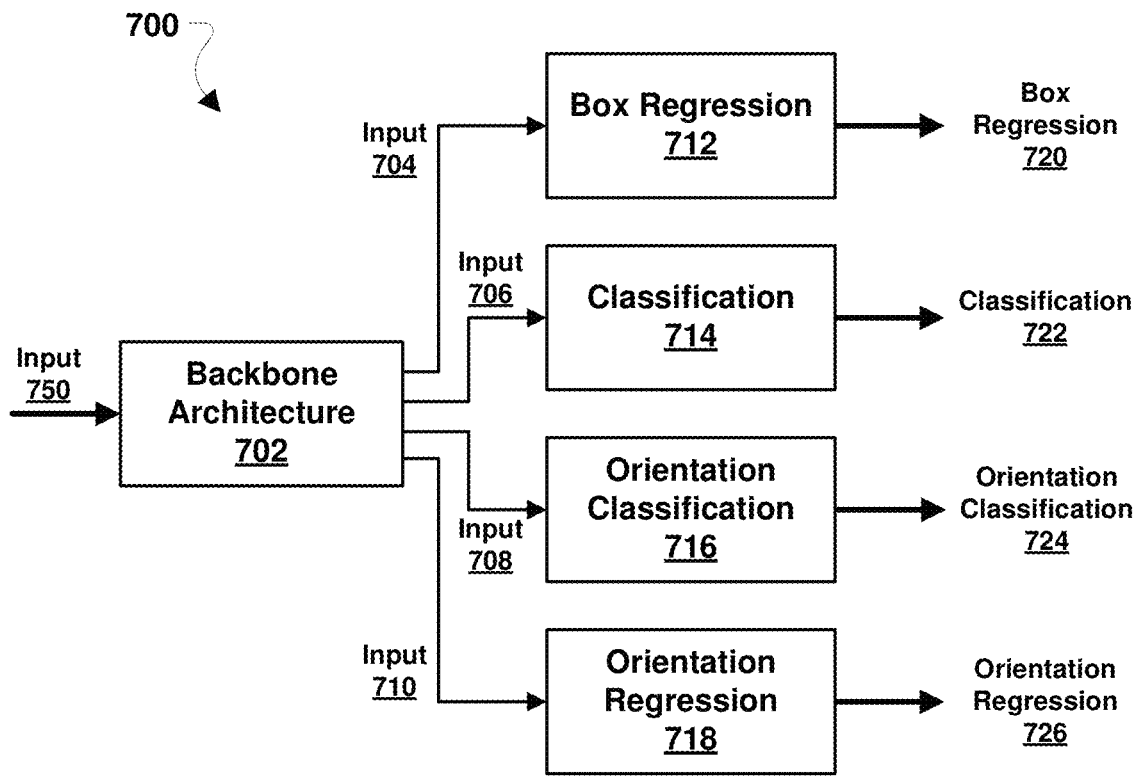
FIG. 7 is a block diagram illustrating components of a neural network architecture to perform object detection based on sensor information in accordance with various embodiments.

FIG. 7 illustrates components of a neural network architecture 700 to perform object detection from sensor information suitable for implementing various embodiments. With reference to FIGS. 1A-7, a backbone neural network architecture 702 (an example of which is illustrated in FIG. 3B) receives an input 750, such as sensor information from a camera, radar, lidar, etc., and performs processing on the input to generate, among the things, various inputs to various classification heads or classification modules. For example, the backbone architecture 702 may provide input 704 to a box regression head 712, and input 706 to a classification head 714, input 708 to and orientation classification head 716, and input 710 to and orientation regression head 718.

The box regression head 712 may output a box regression 720 for each prior box. The classification head 714 may output a classification 722 for each prior box. The orientation classification head 716 may output an orientation classification 724 for each prior box. The orientation regression head 718 may output an orientation regression 726 for each prior box.

As described, the backbone architecture 302 may be followed by an SSD "feed-forward" convolutional network that produces a fixed-size collection of bounding boxes and scores for the presence of object class instances in those boxes, followed by a non-maximum suppression step to produce the final detections. In some embodiments, early network layers may be based on a standard architecture used for high quality image classification (truncated before any classification layers). Various embodiments may add auxiliary structure (e.g., the box regression head 712, the classification head 714, the orientation classification head 716, and the orientation regression head 718) to the SSD to produce desired detections. The processor may use each of the outputs (detections) 720-726 from each of the heads/modules 712-718, as further described below.

Figure 8A:
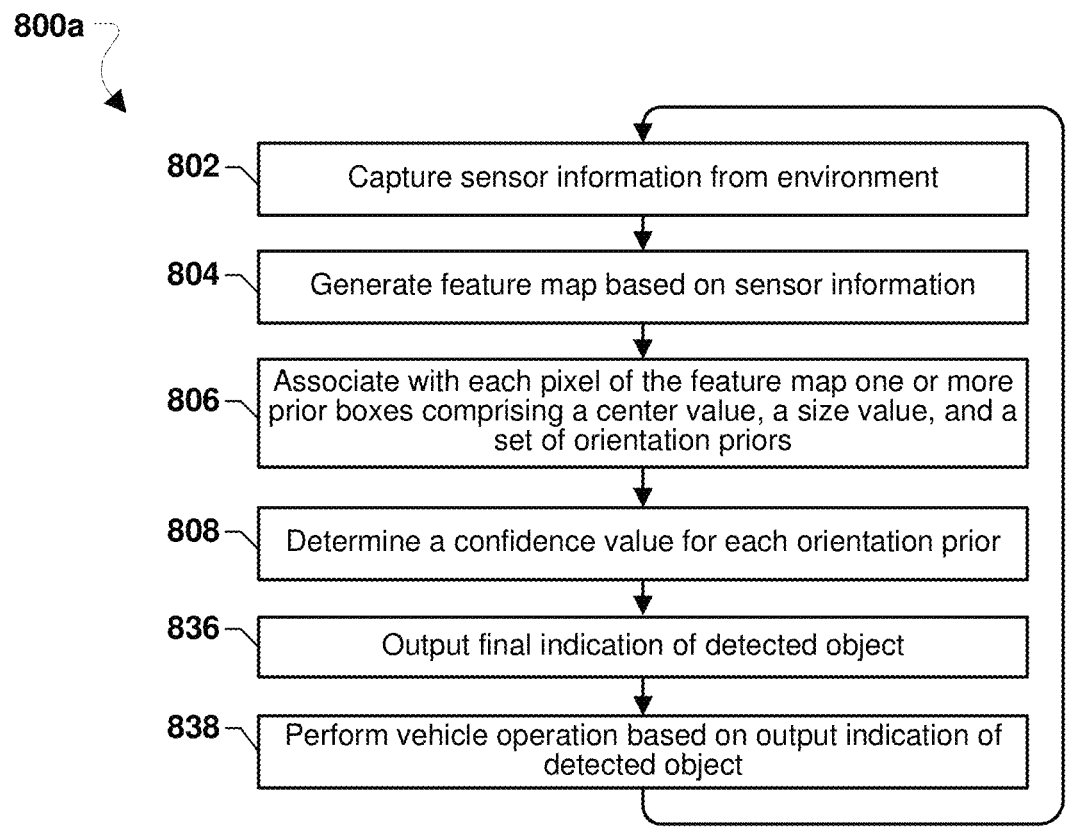
FIG. 8A is a process flow diagram illustrating an embodiment method of processing vehicle sensor information for object detection according to various embodiments.

FIG. 8A illustrates a method 800*a* of processing vehicle sensor information for object detection by a processor according to various embodiments. With reference to FIGS. 1A-8A, the method 800*a* may be implemented in a processor (e.g., 164), processing device (e.g., 200), and/or a control unit (e.g., 140) (variously referred to as a "processor") of a vehicle (e.g., 100). The order of operations performed in blocks 802-834 is merely illustrative, and the operations of blocks 802-834 may be performed in any order and partially simultaneously in various embodiments.

In block 802, the processor may capture, by a sensor (e.g., a camera, radar, lidar, etc.), sensor information regarding the environment around the sensor.

In block 804, the processor may generate a feature map based on the sensor information. The processor may generate the feature map in operations similar to those described for block 404 of the method 400*a* with reference to FIG. 4A.

In block 806, the processor may associate with each pixel of the feature map one or more prior boxes including a center value, a size value, and a set of orientation priors. In some embodiments, the set of orientation priors may include two or more orientation values.

In block 808, the processor may determine a confidence value for each orientation prior.

In block 836, the processor may output a final indication of a detected object. In some embodiments, the output indication of a detected object may be based on a highest confidence orientation prior among the set of orientation priors.

In block 838, the processor may perform a vehicle operation based on the output indication of a detected object, such as generate commands to a vehicle control system to turn, slow or accelerate the vehicle. The processor may perform a vehicle operation based on the output indication of a detected object over a number of frames of sensor information as the operations in the method 800*a* may be repeated many times per second (e.g., 50 times per second or more). Thus, the output indication of a detected object from several frames of sensor information may be combined to further improve the confidence in object detections before the processor takes an action based on the combination of output indication of a detected objects.

The processor may again capture sensor information regarding the environment in block 802.

Figure 8B:
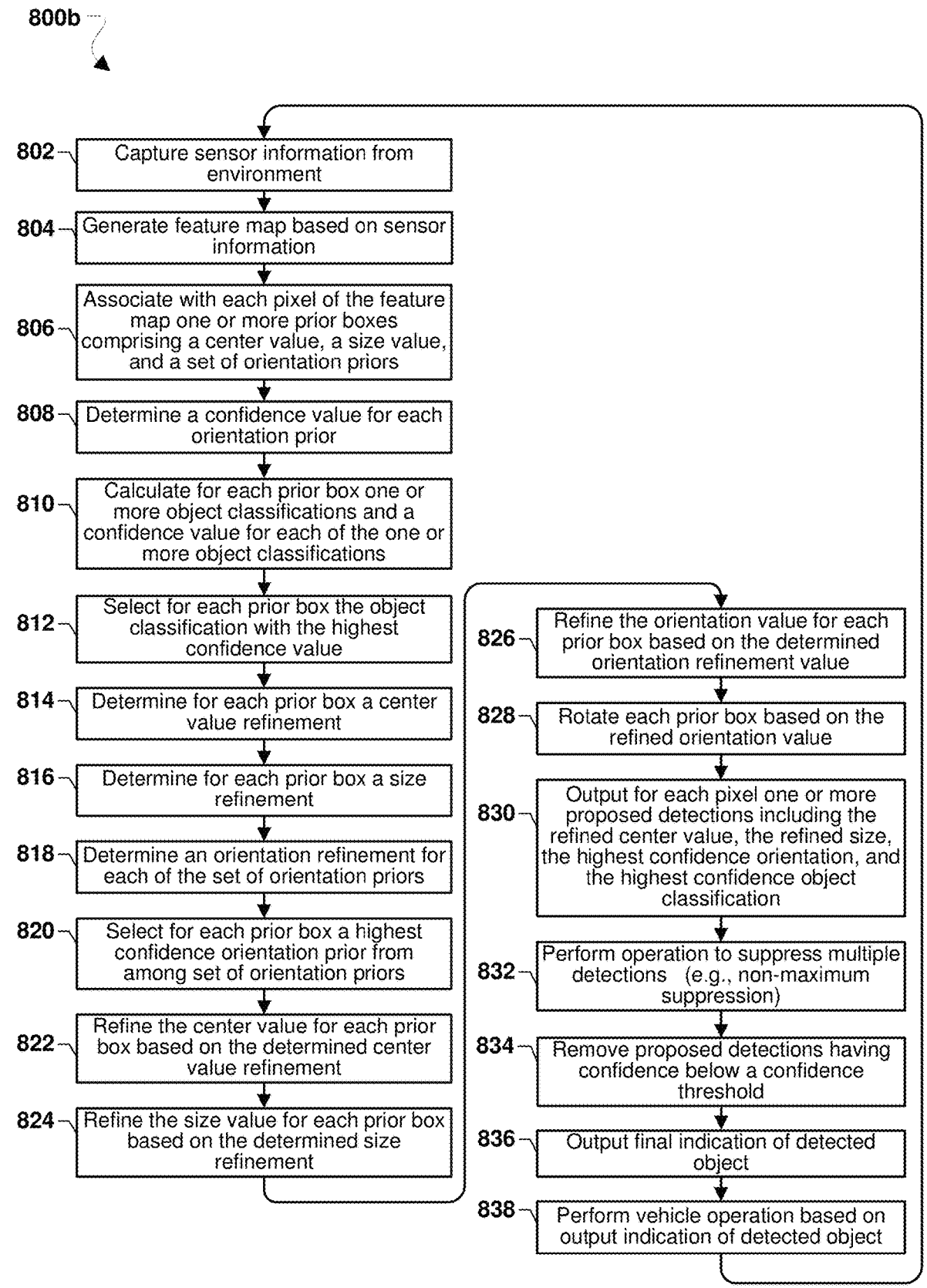
FIG. 8B is a process flow diagram illustrating an embodiment method of processing vehicle sensor information for object detection according to various embodiments.

FIG. 8B illustrates a method 800*b* of processing vehicle sensor information for object detection by a processor according to various embodiments. With reference to FIGS. 1A-8B, the method 800*b* may be implemented in a processor (e.g., 164), processing device (e.g., 200), and/or a control unit (e.g., 140) (variously referred to as a "processor") of a vehicle (e.g., 100). The order of operations performed in blocks 802-834 is merely illustrative, and the operations of blocks 802-834 may be performed in any order and partially simultaneously in various embodiments.

In block 802, the processor may capture, by a sensor (e.g., a camera, radar, lidar, etc.), sensor information regarding the environment around the sensor as described for the like number block in the method 800*a* with reference to FIG. 8A.

In block 804, the processor may generate a feature map based on the sensor information as described for the like number block in the method 800*a* with reference to FIG. 8A.

In block 806, the processor may associate with each pixel of the feature map one or more prior boxes including a center value, a size value, and a set of orientation priors as described for the like number block in the method 800*a* with reference to FIG. 8A. In some embodiments, the set of orientation priors may include two or more orientation values.

In block 808, the processor may determine a confidence value for each orientation prior as described for the like number block in the method 800*a* with reference to FIG. 8A.

In block 810, the processor may calculate for each prior box one or more object classifications and a confidence value for each of the one or more object classifications.

In block 812, the processor may select for each prior box the object classification with the highest confidence value.

In block 814, the processor may determine for each prior box a center value refinement.

In block 816, the processor may determine for each prior box a size refinement. In some embodiments, the size refinement may include a height refinement and a width refinement.

In block 818, the processor may determine an orientation refinement for each of the set of orientation priors.

In block 820, the processor may select for each prior box a highest confidence orientation prior from among the set of orientation priors of each prior box.

In block 822, the processor may refine the center value for each prior box based on the determined center value refinement.

In block 824, the processor may refine the size value for each prior box based on the determined size refinement.

In block 826, the processor may refine the orientation value for each prior box based on the determined orientation refinement value.

In block 828, the processor may rotate each prior box based on the refined orientation value.

In block 830, the processor may output for each pixel of the feature map one or more proposed detections including the refined center value, the refined size, the highest confidence orientation, and the highest confidence object classification.

In block 832, the processor may perform an operation to suppress multiple detections, such as non-maximum suppression.

In block 834, the processor may remove proposed detections having a confidence level below a confidence threshold. In some embodiments, the processor may perform the operations of block 834 as part of or together with the operations of block 832.

In block 836, the processor may output a final indication of a detected object as described for the like number block in the method 800a with reference to FIG. 8A. In some embodiments, the output indication of a detected object may be based on a highest confidence orientation prior from among the set of orientation priors.

In block 838, the processor may perform a vehicle operation based on the output indication of a detected object as described for the like number block in the method 800a with reference to FIG. 8A. The processor may perform a vehicle operation based on the output indication of a detected object over a number of frames of sensor information as the operations in the method 800b may be repeated many times per second (e.g., 50 times per second or more). Thus, the output indication of a detected object from several frames of sensor information may be combined to further improve the confidence in detections of objects before the processor takes an action based on the combination of output indication of detected objects.

The processor may again capture sensor information regarding the environment in block 802.

Figure 9A:
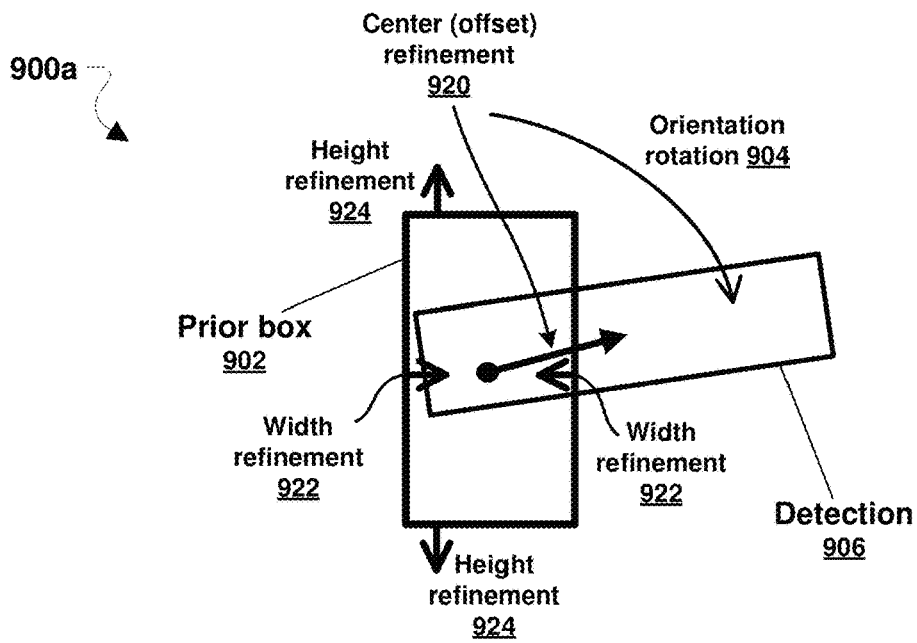
FIGS. 9A-9C are diagrams illustrating outputs of a neural network performing object detection from sensor information according to various embodiments.
Figure 9B:
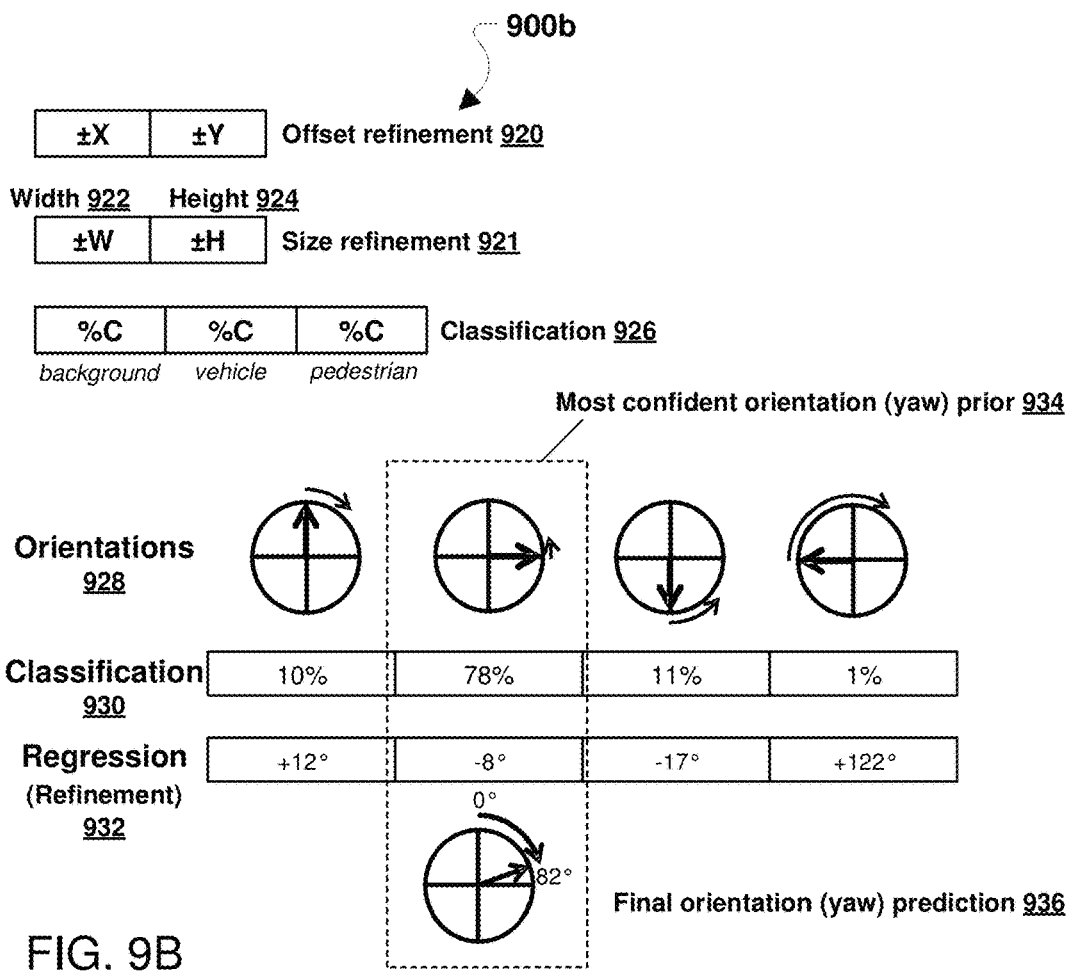
Figure 9C:
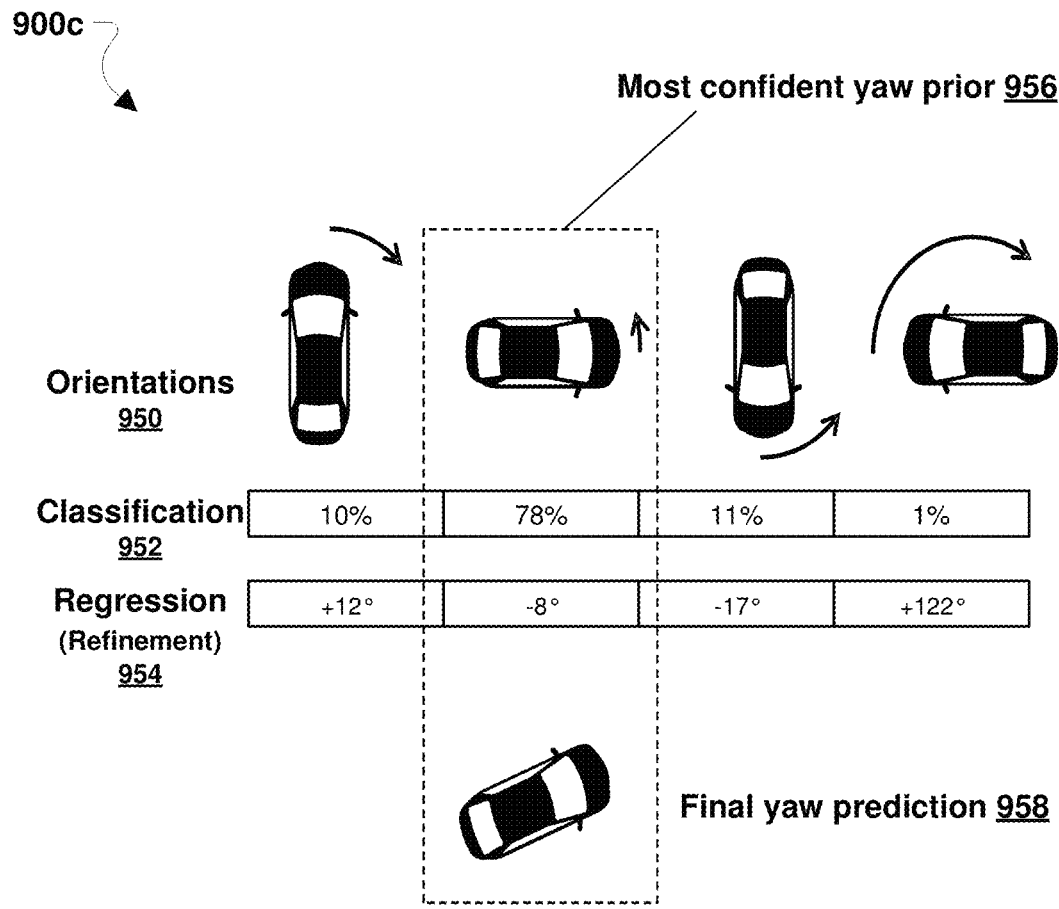

FIGS. 9A-9C are diagrams illustrating output indications of detected objects 900a, 900b, and 900c from a neural network performing object detection, including determining object orientation, from sensor information according to various embodiments. With reference to FIGS. 1A-9C, the neural network may be implemented in a processor (e.g., 164), processing device (e.g., 200), and/or a control unit (e.g., 140) (variously referred to as a "processor") of a vehicle (e.g., 100).

In some embodiments, the processor may associate one or more prior boxes 902 with each pixel of the feature map as described. In some embodiments, the processor may output an indication of a detected object that includes a center value refinement or offset refinement 920 (e.g., ±X, ±Y). The processor may use the center refinement to refine the center value for each prior box 902 as described above.

In some embodiments, the processor may output an indication of a detected object that includes a size refinement 921. In some embodiments, the size refinement may include a width refinement 922 (e.g., ±W) and/or height refinement 924 (e.g., ±H). In some embodiments, the processor may refine a size value for each prior box based on the determined size refinement 921.

In some embodiments, the processor may output an indication of a detected object that includes a classification 926 for each prior box. For example, the classification may include one or more identifications of an object. The processor may also output an indication of a detected object that includes a percentage confidence associated with each classification. For example, the classification 926 includes an identification of an object as part of an image background, a vehicle, and a pedestrian. The processor may output an indication of a detected object that includes a confidence value for each proposed identification (indicated as % C for each classification).

In some embodiments, the processor may output an indication of a detected object that includes one or more orientation predictions 928 for each prior box (as illustrated within the circles, north (or 0°), east (or 90°), south (or) 180°, and west (or 270°), respectively). For each orientation 928, the processor may output an orientation confidence or orientation classification 930 (indicated as % C for each classification). Further, processor may output an indication of a detected object that includes an orientation refinement or regression 932 associated with each orientation. (As illustrated, each orientation refinement 932 corresponds with a curved arrow outside each of the circles illustrating the orientations 928.) In some embodiments, the processor may refine an orientation for each prior box based on the determined orientation refinement.

In some embodiments, the processor may select the highest confidence orientation (e.g., yaw) prior 934. Based on the highest confidence orientation prior, the processor may output an indication of a detected object that includes a final orientation (e.g., yaw) prediction 936. In some embodiments, the processor may refine the highest confidence orientation 934 (e.g., 90°) with a value of a corresponding refinement (or regression) 932 (e.g., −8°) to output a refined highest confidence orientation 936 (e.g., 82°). In some embodiments, based on the final orientation prediction 936, the processor may rotate each prior box 904 based on the refined orientation in value. The processor may output final indication of a detected object 906 including the refined highest confidence orientation.

FIG. 9C illustrates an output indication of a detected object 900c as an example of the output indication of a detected object 900b that includes an orientation of a vehicle. In some embodiments, a processor may receive sensor information such as a radar or lidar return signal and generate a "bird's eye view" of an environment based on the sensor information. For example, the processor may output an indication of a detected object that includes one or more vehicle orientation predictions 950 for each prior box (e.g., north (or 0°), east (or 90°), south (or 180°), and west (or 270°), respectively). For each orientation 950, the processor may output an orientation confidence or orientation classification 952 (indicated as % C for each classification). Further, processor may output an orientation refinement or regression 954 associated with each orientation (illustrated as a curved arrow with each orientation 950, and corresponding with the indication of ±degrees in each refinement 954).

In some embodiments, the processor may refine an orientation for each prior box based on the determined orientation refinement. In some embodiments, the processor may select the highest confidence orientation (e.g., yaw) prior 956. Based on the highest confidence orientation prior, the processor may output a final orientation (e.g., yaw) prediction 958. The processor may output a final indication of a detected object including the refined highest confidence orientation.

Various embodiments may improve the operation of autonomous and semi-autonomous vehicles by providing improved object detection. In particular, various embodiments may improve the operation of processors that process sensor information to provide a more accurate object detection. Various embodiments may improve the operation of processors that process sensor information to provide a more efficient analysis of such sensor information. Various embodiments may improve the operation of processors that process sensor information by enabling the extraction and processing of a greater number of features of the sensor information for a more detailed and accurate analysis of the sensor information. Various embodiments may also be useful in other applications of object detection from sensor information. Therefore, the claims should not be construed to be limited to vehicle systems unless specifically recited in a claim element.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method of processing sensor information for object detection, comprising:
    capturing, by a sensor, sensor information regarding an environment around the sensor;
    generating, by a processor, a feature map based on the sensor information;
    associating, by the processor, with each pixel of the feature map a prior box comprising:
        a plurality of width priors that each include a width value,
        a plurality of height priors that each include a height value, and
        a plurality of orientation priors that each include an orientation value;
    determining, by the processor, a confidence value of each height prior of the plurality of height priors, each width prior of the plurality of width priors, and each orientation prior of the plurality of orientation priors;
    outputting, by the processor, an indication of a detected object based on a highest confidence height prior from among the plurality of height priors, a highest confidence width prior from among the plurality of width priors, and a highest confidence orientation prior from among the plurality of orientation priors; and
    taking an action based on the output indication of a detected object.

2. The method of claim 1, wherein taking an action based on the output indication of a detected object comprises:
    performing, by the processor, a vehicle operation based on the output indication of a detected object.

3. The method of claim 1, further comprising:
    selecting the highest confidence height prior from the plurality of height priors; and selecting the highest confidence width prior from the plurality of width priors.

4. The method of claim 1, further comprising:
determining a height refinement value for each of the plurality of height priors; and
determining a width refinement value for each of the plurality of width priors.

5. The method of claim 4, further comprising:
refining the highest confidence height prior with the height refinement value; and
refining the highest confidence width prior with the width refinement value.

6. The method of claim 5, wherein outputting an indication of a detected object based on a highest confidence height prior from among the plurality of height priors and a highest confidence width prior from among the plurality of width priors comprises:
outputting the indication of a detected object comprising the refined highest confidence height prior and the refined highest confidence width prior.

7. The method of claim 1, wherein the prior box associated with each pixel further comprises a center value.

8. The method of claim 7, further comprising:
determining for each prior box a center value refinement; and
refining the center value with the determined center value refinement.

9. The method of claim 1, further comprising:
determining for each prior box one or more object classifications; and
determining for each of the one or more object classifications a confidence value.

10. The method of claim 1, wherein the output indication of a detected object comprises one or more of a height confidence value and a width confidence value.

11. A vehicle control unit, comprising:
a processor configured with processor-executable instructions to perform operations comprising:
receiving sensor information from a sensor;
generating a feature map based on the sensor information;
associating with each pixel of the feature map a prior box comprising:
a plurality of width priors that each include a width value,
a plurality of height priors that each include a height value, and
a plurality of orientation priors that each include an orientation value;
determining a confidence value of each height prior of the plurality of height priors, each width prior of the plurality of width priors for each prior box, and each orientation prior of the plurality of orientation priors;
outputting an indication of a detected object based on a highest confidence height prior from among the plurality of height priors a highest confidence width prior from among the plurality of width priors, and a highest confidence orientation prior from among the plurality of orientation priors; and
taking an action based on the output indication of a detected object.

12. The vehicle control unit of claim 11, wherein the processor is configured with processor-executable instructions to perform operations such that taking an action based on the output indication of a detected object comprises:
performing a vehicle operation based on the output indication of a detected object.

13. The vehicle control unit system of claim 11, wherein the processor is configured with processor-executable instructions to perform operations further comprising:
selecting the highest confidence height prior from the plurality of height priors; and
selecting the highest confidence width prior from the plurality of width priors.

14. The vehicle control unit of claim 11, wherein the processor is configured with processor-executable instructions to perform operations further comprising:
determining a height refinement value for each of the plurality of height priors; and
determining a width refinement value for each of the plurality of width priors.

15. The vehicle control unit of claim 14, wherein the processor is configured with processor-executable instructions to perform operations further comprising:
refining the highest confidence height prior with the height refinement value; and
refining the highest confidence width prior with the width refinement value.

16. The vehicle control unit of claim 15, wherein the processor is configured with processor-executable instructions to perform operations such that outputting an indication of a detected object based on a highest confidence height prior from among the plurality of height priors and a highest confidence width prior from among the plurality of width priors comprises:
outputting the indication of a detected object comprising the refined highest confidence height prior and the refined highest confidence width prior.

17. The vehicle control unit of claim 11, wherein the processor is configured with processor-executable instructions to perform operations such that each associated prior box further comprises a center value.

18. The vehicle control unit of claim 17, wherein the processor is configured with processor-executable instructions to perform operations further comprising:
determining for each prior box a center value refinement; and
refining the center value with the determined center value refinement.

19. The vehicle control unit of claim 11, wherein the processor is configured with processor-executable instructions to perform operations further comprising:
determining for each prior box one or more object classifications; and
determining for each of the one or more object classifications a confidence value.

20. The vehicle control unit of claim 11, wherein the processor is configured with processor-executable instructions to perform operations such that the output indication of a detected object comprises one or more of a height confidence value and a width confidence value.

21. A method of processing vehicle sensor information for object detection, comprising:
capturing, by a sensor, sensor information regarding an environment around the sensor;
generating, by a processor, a feature map based on the sensor information;
associating, by the processor, with each pixel of the feature map, one or more prior boxes each comprising a center value, a size value, and a plurality of orientation priors that each include an orientation value;
determining, by the processor, a confidence value for each orientation prior of the plurality of orientation priors;

outputting, by the processor, an indication of a detected object based on the highest confidence orientation; and performing, by the processor, a vehicle operation based on the output indication of a detected object.

22. The method of claim 21, further comprising:

selecting for each prior box a highest confidence orientation prior from among the plurality of orientation priors.

23. The method of claim 21, further comprising:

determining an orientation refinement for each of the plurality of orientation priors.

24. The method of claim 23, further comprising:

refining an orientation value for each prior box based on the determined orientation refinement.

25. The method of claim 24, further comprising:

rotating each prior box based on the refined orientation value.

26. The method of claim 21, wherein the output indication of a detected object comprises an orientation confidence value.

27. A vehicle control unit, comprising:

a processor configured with processor-executable instructions to perform operations comprising:

receiving sensor information regarding an environment around a sensor;

generating, by a processor, a feature map based on the sensor information;

associating, by the processor, with each pixel of the feature map, one or more prior boxes each comprising a center value, a size value, and a plurality of orientation priors that each include an orientation value;

determining, by the processor, a confidence value for each orientation prior of the plurality of orientation priors;

outputting, by the processor, an indication of a detected object based on the highest confidence orientation; and performing, by the processor, a vehicle operation based on the output indication of a detected object.

28. The vehicle control unit of claim 27, wherein the processor is configured with processor-executable instructions to perform operations further comprising:

selecting for each prior box a highest confidence orientation prior from among the plurality of orientation priors.

29. The vehicle control unit of claim 27, wherein the processor is configured with processor-executable instructions to perform operations further comprising:

determining an orientation refinement for each of the plurality of orientation priors; and refining an orientation value for each prior box based on the determined orientation refinement.

30. The vehicle control unit of claim 29, wherein the processor is configured with processor-executable instructions to perform operations further comprising:

rotating each prior box based on the refined orientation value.

* * * * *